United States Patent
Gordon

(10) Patent No.: US 10,198,321 B1
(45) Date of Patent: Feb. 5, 2019

(54) SYSTEM AND METHOD FOR CONTINUOUS DATA PROTECTION

(71) Applicant: STORONE LTD., Ra'anana (IL)

(72) Inventor: Raz Gordon, Hadera (IL)

(73) Assignee: STORONE LTD., Ra'Anana (IL)

( * ) Notice: Subject to any disclaimer, the term of this patent is extended or adjusted under 35 U.S.C. 154(b) by 442 days.

(21) Appl. No.: 14/671,443

(22) Filed: Mar. 27, 2015

Related U.S. Application Data

(60) Provisional application No. 61/973,327, filed on Apr. 1, 2014.

(51) Int. Cl.
*G06F 17/30* (2006.01)
*G06F 11/14* (2006.01)

(52) U.S. Cl.
CPC .... *G06F 11/1448* (2013.01); *G06F 17/30088* (2013.01); *G06F 17/30312* (2013.01); *G06F 17/30365* (2013.01)

(58) Field of Classification Search
CPC ............................ G06F 3/0601; G06F 11/1474
See application file for complete search history.

(56) References Cited

U.S. PATENT DOCUMENTS

| | | | |
|---|---|---|---|
| 5,481,694 A * | 1/1996 | Chao ..................... | G06F 3/0601 711/112 |
| 6,105,103 A * | 8/2000 | Courtright, II ....... | G06F 3/0608 707/999.202 |
| 6,263,338 B1 * | 7/2001 | Ronstrom ......... | G06F 17/30368 |
| 8,805,788 B2 * | 8/2014 | Gross, IV ........... | G06F 11/1451 707/649 |
| 2002/0061778 A1 | 5/2002 | Acres | |
| 2005/0283594 A1 * | 12/2005 | Kano .................. | H04L 67/1095 713/1 |
| 2006/0047925 A1 * | 3/2006 | Perry .................. | G06F 11/1474 711/162 |
| 2007/0195692 A1 * | 8/2007 | Hagglund ........... | G06F 11/2058 370/216 |
| 2008/0243956 A1 * | 10/2008 | Yamamoto .......... | G06F 11/1469 |

(Continued)

OTHER PUBLICATIONS

Corman et al, "Introduction to algorithms, Second edition," The Knuth-Morris-Pratt Algorithm, 2001.

(Continued)

Primary Examiner — Tarek Chbouki
(74) *Attorney, Agent, or Firm* — Oliff PLC

(57) ABSTRACT

A computerized system capable of continuous data protection (CDP) and method of operating thereof are provided. A CDP data structure is stored in memory. The CDP data structure includes a base snapshot acquired at a first point in time and a log. The log includes a first log region and a second log region. The log is associated with an index, which includes a first index region stored on a secondary memory and associated with the first log region, a second index region stored on a primary memory and associated with the second log region. The first log region and the second log region are updated responsive to an update of a dynamic checkpoint when the checkpoint update criterion is met. The first index region is updated responsive to the update of the first log region and the second log region, and the second index region is updated upon the update of the first index region.

11 Claims, 20 Drawing Sheets

(56) References Cited

U.S. PATENT DOCUMENTS

| | | | |
|---|---|---|---|
| 2010/0138591 A1* | 6/2010 | Yano | G11C 16/20 |
| | | | 711/103 |
| 2011/0265085 A1* | 10/2011 | Kedem | G06F 9/45558 |
| | | | 718/1 |
| 2015/0234710 A1* | 8/2015 | Berrington | G06F 11/1407 |
| | | | 707/664 |

OTHER PUBLICATIONS

Pugh, W., "Skip lists: Aprobabilistic Alternative to Balanced Trees," Communications of the ACM, vol. 33, No. 6, Jun. 1990, pp. 668-676.

B±-Tree Retrieved from the Internet:.<http://www.mec.ac.in/resources/notes/ds/bplus.htm>.

U.S. Appl. No. 14/185,059, filed Feb. 20, 2014 in the name of Gordon.

* cited by examiner

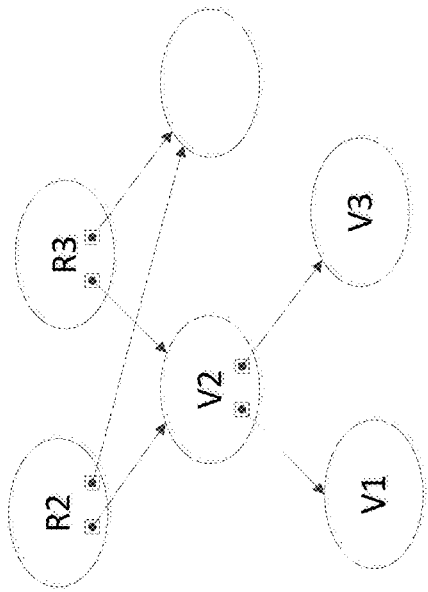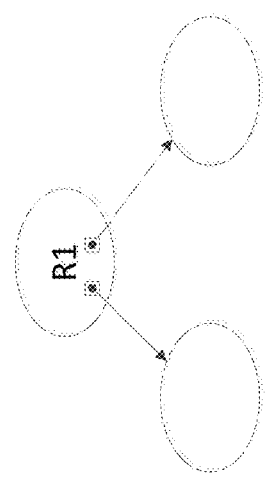
Fig. 12a
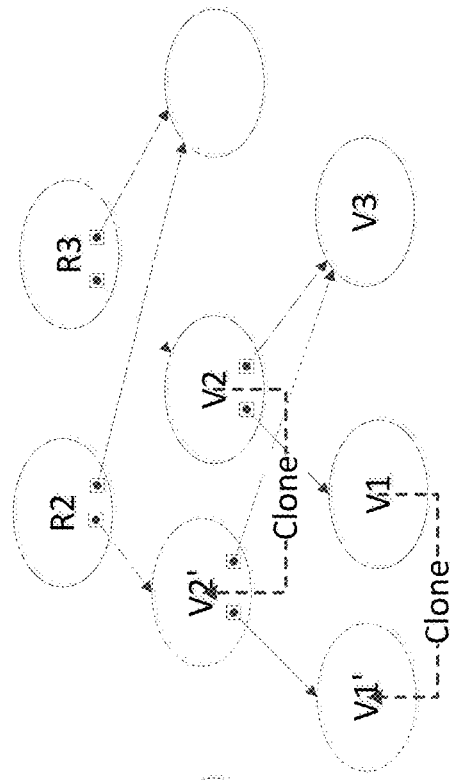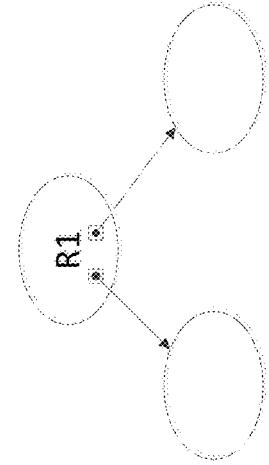
Fig. 12b

SYSTEM AND METHOD FOR CONTINUOUS DATA PROTECTION

TECHNICAL FIELD

The presently disclosed subject matter relates to the field of Continuous Data Protection (CDP).

BACKGROUND

Continuous Data Protection (CDP) is an important feature of storage systems that allows recovery of the data that was stored in the storage system at various points in time. Current CDP systems require a relatively long process to set-up the storage system so that data at a given point in time will be readable. Since the process of recovering data involves finding the right point in time to recover from, this set-up time might severely affect the duration of such recovery process. There is thus a need in the art for a new method and system for continuous data protection.

GENERAL DESCRIPTION

In accordance with certain examples of the presently disclosed subject matter, there is provided a computerized system comprising: a processor; and a computer-readable non-transient memory in communication with the processor, the memory storing instructions that when executed manage a Continuous Data Protection (CDP) data structure that includes: a base snapshot acquired at a first point in time; a log having a first log region and a second log region, the log being stored on a first memory; the log being associated with an index; the first log region comprising first information of a first sequence of write operations performed after the first point-in-time and on or before a second point-in-time defined by a checkpoint; the first information includes, for each write operation of the first sequence of write operations, at least first routing data facilitating direct or indirect access to first written data; the first log region is associated with a first index region of the index, the first index region facilitating access to the first information or part thereof; each write operation of the first sequence of write operations is associated with first write time data indicative of a position of the write operation within the first sequence; the second log region comprising second information of a second sequence of write operations performed after the second point-in-time; the second information includes, for each write operation of the second group of write operations, at least second routing data facilitating direct or indirect access to second written data; the second log region is associated with a second index region of the index; each write operation of the second sequence of write operations is associated with second write time data indicative of a position of the write operation within the second sequence.

According to certain examples, the first information further includes the first written data and wherein the second information further includes the second written data.

In accordance with certain examples of the presently disclosed subject matter, there is provided a computerized method of updating a checkpoint, comprising:

A. providing a Continuous Data Protection (CDP) data structure, the CDP data structure being stored on a computer-readable non-transient memory in communication with a processor, the CDP data structure including: a base snapshot acquired at a first point in time; a log having a first log region and a second log region, the log being stored on a first memory; the log being associated with an index; the first log region comprising first information of a first sequence of write operations performed after the first point-in-time and on or before a second point-in-time defined by a checkpoint; the first information includes, for each write operation of the first sequence of write operations, at least first routing data facilitating direct or indirect access to first written data; the first log region is associated with a first index region of the index, the first index region facilitating access to the first information or part thereof; each write operation of the first sequence of write operations is associated with first write time data indicative of a position of the write operation within the first sequence; the second log region comprising second information of a second sequence of write operations performed after the second point-in-time; the second information includes, for each write operation of the second group of write operations, at least second routing data facilitating direct or indirect access to second written data; the second log region is associated with a second index region of the index; each write operation of the second sequence of write operations is associated with second write time data indicative of a position of the write operation within the second sequence;

B. updating the checkpoint, including: updating, upon a checkpoint update criteria being met, the checkpoint to define a third point-in-time, the third point-in-time being after the second point-in-time, giving rise to updated first log region and updated second log region; writing a portion of the second information from the second log region to a third memory, the portion including selected write operations of the second group of write operations, the second write time data of the selected write operations being indicative of a write time before the third point-in-time and after the second point-in-time.

According to certain examples, updating the checkpoint further comprises: calculating an updated first index region of the first log region, the updated first index region facilitating access to the first information of the updated first log region; and calculating an updated second index region of the second log region, the updated second index region facilitating access to the second information of the updated second log region, wherein calculating the updated second index region is performed in response to calculating the updated first index region.

In accordance with certain examples of the presently disclosed subject matter, there is provided a method of retrieving required routing data facilitating direct or indirect access to required written data, the method comprising:

(A) providing a CDP data structure, the CDP data structure being stored on a computer-readable non-transient memory in communication with a processor, the CDP data structure including: a base snapshot acquired at a first point in time; a log having a first log region and a second log region, the log being stored on a first memory; the log being associated with an index; the first log region comprising first information of a first sequence of write operations performed after the first point-in-time and on or before a second point-in-time defined by a checkpoint; the first information includes, for each write operation of the first sequence of write operations, at least first routing data facilitating direct or indirect access to first written data; the first log region is associated with a first index region of the index, the first index region facilitating access to the first information or part thereof; each write operation of the first sequence of write operations is associated with first write time data indicative of a position of the write operation within the first sequence; the second log region comprising second information of a second sequence of write operations performed after the second point-in-time; the second information includes, for each write operation of the second group of write operations, at least second routing data facilitating direct or indirect access to second written data; the second log region is associated with a second index region of the index; each write operation of the second sequence of write operations is associated with second write time data indicative of a position of the write operation within the second sequence;

(AA) retrieving the required routing data from the CDP data structure, including:
  (i) receiving a read request including a required physical storage object address and a required point-in-time;
  (ii) determining if the required point-in-time is later than, or equal to, the second point-in-time, and if in the affirmative:
    a. determining, using the second index region of the index, if the second log region includes one or more matching second routing data having a second physical storage object address equal to the required physical storage object address and the second write time data earlier than or equal to the required point-in-time, and if in the affirmative, a first criterion is met;
    b. in response to meeting the first criterion, retrieving the matching second routing data having the second write time data indicating the most recent time earlier than, or equal to, the required point-in-time from the second log region, the matching second routing data being the required routing data;
    c. otherwise, in case the first criterion is not met, accessing a third memory utilizing the required physical storage address for retrieving a matching third routing data facilitating direct or indirect access to the required written data, the matching third routing data being the required routing data;
  (iii) otherwise if the required point-in-time is earlier than the second point in time:
    a. determining, using the first index region of the index, if the first log region includes one or more matching first routing data having a first physical storage object address equal to the required physical storage object address and the first write time data earlier than or equal to the required point-in-time, and if in the affirmative, a second criterion is met;
    b. in response to meeting the second criterion, retrieving the matching first routing data having the first write time data indicating the most recent time earlier than, or equal to, the required point-in-time from the first log region, the matching first routing data being the required routing data;
    c. otherwise, in case the second criterion is not met, accessing the third memory utilizing the required physical storage address for retrieving a matching fourth routing data facilitating direct or indirect access to the required written data, the matching fourth routing data being the required routing data.

According to certain examples, the first routing data is the first physical storage object address facilitating direct access to the first written data.

According to certain examples, the second routing data is a second physical storage object address facilitating direct access to the second written data.

According to certain examples, the required physical storage object address is associated with the first routing data and is obtained using a given logical storage object address.

According to certain examples, the required physical storage object address is associated with the second routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the third routing data is a third physical storage object address facilitating direct access to the third written data.

According to certain examples, the required physical storage object address is associated with the third routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the fourth routing data is a fourth routing physical storage object address facilitating direct access to the third written data.

According to certain examples, the required physical storage object address is associated with the fourth routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the method further comprises:
  A. providing a graph data structure comprising a plurality of Mapping Functions (MFs) of the third memory, wherein:
    (a) each MF of the MFs being implemented using a tree data structure and having an MF root vertex;
    (b) each of the MF root vertices having MF root vertex data including:
      a. one or more edges pointing at respective child vertices of the MF root vertex, each child vertex of the child vertices spanning a corresponding sub-tree, if any;
      b. one or more navigation keys, each navigation key being associated with two key-ranges, each key-range being associated with an edge of the edges that points at a respective child vertex of the child vertices; the key-range being indicative of a logical storage object address value range of the sub-tree spanned by the child vertex;

(c) each of the child vertices, and each descendent vertex thereof, if any, include descendent vertex data being routing data, the routing data including:
  a. one or more descendent edges pointing at respective descendent vertices of the child vertices or the descendent vertex thereof, each descendent vertex of the descendent vertices spanning a corresponding descendent sub-tree, if any;
  b. one or more descendent navigation keys, the descendent navigation keys being representative of at least two descendent key-ranges, each descendent key-range being associated with a descendent edge of the descendent edges that points at a respective descendent vertex of the descendent vertices; the descendent key-range being indicative of a descendent logical storage object address value range of the descendent sub-tree spanned by the descendent vertex;

B. searching the graph data structure, including:
  (i) providing:
    a. an incoming edge pointing at a given vertex of a given MF of the MFs; the edge being the required physical storage object address;
    b. a required logical storage object address being a given key;
  (ii) retrieving the required routing data from the CDP data structure as stipulated in the step (AA) utilizing the required physical storage object address and the required point-in-time; the retrieved required routing data being the given vertex;
  (iii) searching in the given vertex for an outgoing edge, including comparing the given key with at least one navigation key of the navigation keys of the given vertex and identifying a key range, of the key ranges, that is associated with the navigation key and which encompasses the given key; the outgoing edge being associated with the identified key range; the outgoing edge being another required physical storage object address and points at a child vertex of the given vertex or at the required written data;
  (iv) repeating a cycle of calculation of steps B(ii) and B(iii) as many times as required until a criterion is met, wherein:
    the cycle in step B(ii) utilizes the another required physical storage address obtained in step B(iii) of the previous cycle of calculation, for obtaining another retrieved required routing data being the child vertex that is being pointed at by the outgoing edge obtained in step B(iii) of the previous cycle;
    the cycle in step B(iii) includes searching the child vertex retrieved in B(ii);
    the criterion being that either the outgoing edge points at the required written data or the required routing data being matching third routing data or matching fourth routing data retrieved from the third memory.

According to certain examples, the required written data is logged in the log, and the method further comprises:
retrieving the required written data from the CDP data structure, including:
  (i) receiving a written data read request including the required physical storage object address and the required point-in-time;
  (ii) determining if the required point-in-time is later than, or equal to, the second point-in-time, and if in the affirmative:
    a. determining, using the second index region of the index, if the second log region includes one or more matching second written data having a second physical storage object address equal to the required physical storage object address and the second write time data earlier than, or equal to, the required point-in-time, and if in the affirmative, a third criterion is met;
    b. in response to meeting the third criterion, retrieving the matching second written data having the second write time data indicating the most recent time earlier than, or equal to, the required point-in-time from the second log region, the matching second routing data being the required written data;
    c. otherwise, in case the third criterion is not met, accessing the third memory utilizing the required physical storage address for retrieving the required written data;
  (iii) otherwise if the required point-in-time is earlier than the second point in time:
    a. determining, using the first index region of the index, if the first log region includes one or more matching first written data having a first physical storage object address equal to the required physical storage object address and the first write time data earlier than, or equal to, the required point-in-time, and if in the affirmative, a fourth criterion is met;
    b. in response to meeting the fourth criterion, retrieving the matching first written data having the first write time data indicating the most recent time earlier than the required point-in-time from the first log region, the matching first written data being the required written data;
    c. otherwise, in case the fourth criterion is not met, accessing the third memory utilizing the required physical storage address for retrieving the required written data.

According to certain examples, the required written data is not logged in the log, and wherein the criterion being met in the case that the outgoing edge points at the required written data; the method further comprising retrieving the required written data from the third memory utilizing the another required physical storage object address.

According to certain examples, the criterion being met in the case that the required routing data being matching third routing data or matching fourth routing data retrieved from the third memory, the method further comprising performing the following (AAA):
  (i) retrieving the required routing data from the third memory utilizing the required physical storage object address; the retrieved required routing data being the given vertex;
  (ii) searching in the given vertex for another outgoing edge, including comparing the given key with at least one navigation key of the navigation keys of the given vertex and identifying another key range, of the key ranges, that is associated with the navigation key and which encompasses the given key; the another outgoing edge being associated with the identified key range; the another outgoing edge being a certain required physical storage object address and points at a child vertex of the given vertex or at the required written data;

(iii) repeating a second cycle of calculation of steps (AAA)(i) and (AAA)(ii) as many times as required until another criterion is met, wherein:
the cycle in step (AAA)(i) utilizes the certain required physical storage address obtained in step (AAA)(ii) of the previous cycle of calculation, for obtaining a certain retrieved required routing data being the child vertex that is being pointed at by the outgoing edge obtained in step (AAA)(ii) of the previous cycle;
the cycle in step (AAA)(ii) includes searching the child vertex retrieved in (AAA)(i);
the another criterion being that the another outgoing edge points at the required written data the required written data;
(iv) retrieving the required written data from the third memory utilizing the certain required physical storage object address.

According to certain examples, the read request further includes a given snapshot having a given MF root vertex, and wherein the incoming edge is an outgoing edge of the given MF root vertex.

According to certain examples, the first memory is a secondary memory.

According to certain examples, the first index region is stored on the first memory and the second index region is stored on a second memory.

According to certain examples, the second memory is a primary memory.

According to certain examples, at least part of the first log region is also cached on the second memory.

According to certain examples, at least part of the second log region is also cached on the second memory.

According to certain examples, the index is a single index having the first index region and the second index region.

According to certain examples, the index includes at least two distinct indexes, at least a first index of the distinct indexes constitutes the first index region and at least a second index of the distinct indexes constitutes the second index region.

According to certain examples, the third memory is the secondary memory.

According to certain examples, the third memory is a second secondary memory.

According to certain examples, the data structure provides Continuous Data Protection (CDP).

According to certain examples, the CDP has a Zero Recovery Time Objective.

According to certain examples, the first write time data is a generation number or a write time timestamp.

According to certain examples, the second write time data is a generation number or a write time timestamp.

In accordance with certain examples of the presently disclosed subject matter, there is provided a system for updating a checkpoint, the system comprising a processor configured to:
A. provide a Continuous Data Protection (CDP) data structure, the CDP data structure being stored on a computer-readable non-transient memory in communication with a processor, the CDP data structure including: a base snapshot acquired at a first point in time; a log having a first log region and a second log region, the log being stored on a first memory; the log being associated with an index; the first log region comprising first information of a first sequence of write operations performed after the first point-in-time and on or before a second point-in-time defined by a checkpoint; the first information includes, for each write operation of the first sequence of write operations, at least first routing data facilitating direct or indirect access to first written data; the first log region is associated with a first index region of the index, the first index region facilitating access to the first information or part thereof; each write operation of the first sequence of write operations is associated with first write time data indicative of a position of the write operation within the first sequence; the second log region comprising second information of a second sequence of write operations performed after the second point-in-time; the second information includes, for each write operation of the second group of write operations, at least second routing data facilitating direct or indirect access to second written data; the second log region is associated with a second index region of the index; each write operation of the second sequence of write operations is associated with second write time data indicative of a position of the write operation within the second sequence;
B. update the checkpoint, including: update, upon a checkpoint update criteria being met, the checkpoint to define a third point-in-time, the third point-in-time being after the second point-in-time, giving rise to updated first log region and updated second log region; write a portion of the second information from the second log region to a third memory, the portion including selected write operations of the second group of write operations, the second write time data of the selected write operations being indicative of a write time before the third point-in-time and after the second point-in-time.

According to certain examples, the update the checkpoint further comprises: calculate an updated first index region of the first log region, the updated first index region facilitating access to the first information of the updated first log region; and calculate an updated second index region of the second log region, the updated second index region facilitating access to the second information of the updated second log region, wherein calculating the updated second index region is performed in response to calculating the updated first index region.

According to certain examples, there is provided system for retrieving required routing data facilitating direct or indirect access to required written data, the system comprising a processor configured to:
(A) provide a CDP data structure, the CDP data structure being stored on a computer-readable non-transient memory in communication with a processor, the CDP data structure including: a base snapshot acquired at a first point in time; a log having a first log region and a second log region, the log being stored on a first memory; the log being associated with an index; the first log region comprising first information of a first sequence of write operations performed after the first point-in-time and on or before a second point-in-time defined by a checkpoint; the first information includes, for each write operation of the first sequence of write operations, at least first routing data facilitating direct or indirect access to first written data; the first log region is associated with a first index region of the index, the first index region facilitating access to the first information or part thereof; each write operation of the first sequence of write operations is associated with first write time data indicative of a position of the write operation within the first sequence; the second log region comprising second information of a second sequence of write operations performed after the second point-in-time; the second information includes, for each write operation of the second group of write operations, at least second routing data facilitating direct or indirect access to second written data; the second log region is associated with a second index region of the index; each write operation of the second sequence of write operations is associated with second write time data indicative of a position of the write operation within the second sequence;

(AA) retrieve the required routing data from the CDP data structure, including:
  (i) receive a read request including a required physical storage object address and a required point-in-time;
  (ii) determine if the required point-in-time is later than, or equal to, the second point-in-time, and if in the affirmative:
    a. determine, using the second index region of the index, if the second log region includes one or more matching second routing data having a second physical storage object address equal to the required physical storage object address and the second write time data earlier than or equal to the required point-in-time, and if in the affirmative, a first criterion is met;
    b. in response to meeting the first criterion, retrieve the matching second routing data having the second write time data indicating the most recent time earlier than, or equal to, the required point-in-time from the second log region, the matching second routing data being the required routing data;
    c. otherwise, in case the first criterion is not met, access a third memory utilizing the required physical storage address for retrieving a matching third routing data facilitating direct or indirect access to the required written data, the matching third routing data being the required routing data;
  (iii) otherwise if the required point-in-time is earlier than the second point in time:
    a. determine, using the first index region of the index, if the first log region includes one or more matching first routing data having a first physical storage object address equal to the required physical storage object address and the first write time data earlier than or equal to the required point-in-time, and if in the affirmative, a second criterion is met;
    b. in response to meeting the second criterion, retrieve the matching first routing data having the first write time data indicating the most recent time earlier than, or equal to, the required point-in-time from the first log region, the matching first routing data being the required routing data;
    c. otherwise, in case the second criterion is not met, access the third memory utilizing the required physical storage address for retrieving a matching fourth routing data facilitating direct or indirect access to the required written data, the matching fourth routing data being the required routing data.

According to certain examples, the first routing data is the first physical storage object address facilitating direct access to the first written data.

According to certain examples, the second routing data is a second physical storage object address facilitating direct access to the second written data.

According to certain examples, the required physical storage object address is associated with the first routing data and is obtained using a given logical storage object address.

According to certain examples, the required physical storage object address is associated with the second routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the third routing data is a third physical storage object address facilitating direct access to the third written data.

According to certain examples, the required physical storage object address is associated with the third routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the fourth routing data is a fourth routing physical storage object address facilitating direct access to the third written data.

According to certain examples, the required physical storage object address is associated with the fourth routing data and is obtained using a given logical storage object address.

According to certain examples, the required physical storage object address is a physical block address of a cell of a given snapshot array, wherein the physical block address is a start address of the given snapshot array plus an offset, the offset being defined by the given logical storage object address.

According to certain examples, the processor is further configured to:
  A. provide a graph data structure comprising a plurality of Mapping Functions (MFs) of the third memory, wherein:
    (a) each MF of the MFs being implemented using a tree data structure and having an MF root vertex;
    (b) each of the MF root vertices having MF root vertex data including:
      a. one or more edges pointing at respective child vertices of the MF root vertex, each child vertex of the child vertices spanning a corresponding sub-tree, if any;
      b. one or more navigation keys, each navigation key being associated with two key-ranges, each key-range being associated with an edge of the edges that points at a respective child vertex of the child vertices; the key-range being indicative of a logical storage object address value range of the sub-tree spanned by the child vertex;
    (c) each of the child vertices, and each descendent vertex thereof, if any, include descendent vertex data being routing data, the routing data including:
      a. one or more descendent edges pointing at respective descendent vertices of the child vertices or the descendent vertex thereof, each descendent vertex of the descendent vertices spanning a corresponding descendent sub-tree, if any;
  b. one or more descendent navigation keys, the descendent navigation keys being representative of at least two descendent key-ranges, each descendent key-range being associated with a descendent edge of the descendent edges that points at a respective descendent vertex of the descendent vertices; the descendent key-range being indicative of a descendent logical storage object address value range of the descendent sub-tree spanned by the descendent vertex;
B. search the graph data structure, including:
  (i) provide:
    a. an incoming edge pointing at a given vertex of a given MF of the MFs; the edge being the required physical storage object address;
    b. a required logical storage object address being a given key;
  (ii) retrieve the required routing data from the CDP data structure as stipulated in the step (AA) utilizing the required physical storage object address and the required point-in-time; the retrieved required routing data being the given vertex;
  (iii) search in the given vertex for an outgoing edge, including comparing the given key with at least one navigation key of the navigation keys of the given vertex and identifying a key range, of the key ranges, that is associated with the navigation key and which encompasses the given key; the outgoing edge being associated with the identified key range; the outgoing edge being another required physical storage object address and points at a child vertex of the given vertex or at the required written data;
  (iv) repeat a cycle of calculation of steps B(ii) and B(iii) as many times as required until a criterion is met, wherein:
    the cycle in step B(ii) utilizes the another required physical storage address obtained in step B(iii) of the previous cycle of calculation, for obtaining another retrieved required routing data being the child vertex that is being pointed at by the outgoing edge obtained in step B(iii) of the previous cycle;
    the cycle in step B(iii) includes searching the child vertex retrieved in B(ii);
    the criterion being that either the outgoing edge points at the required written data or the required routing data being matching third routing data or matching fourth routing data retrieved from the third memory.

According to certain examples, the required written data is logged in the log, and wherein the processor is further configured to:
  retrieve the required written data from the CDP data structure, including:
    (i) receive a written data read request including the required physical storage object address and the required point-in-time;
    (ii) determine if the required point-in-time is later than, or equal to, the second point-in-time, and if in the affirmative:
      a. determine, using the second index region of the index, if the second log region includes one or more matching second written data having a second physical storage object address equal to the required physical storage object address and the second write time data earlier than, or equal to, the required point-in-time, and if in the affirmative, a third criterion is met;
      b. in response to meeting the third criterion, retrieve the matching second written data having the second write time data indicating the most recent time earlier than, or equal to, the required point-in-time from the second log region, the matching second routing data being the required written data;
      c. otherwise, in case the third criterion is not met, access the third memory utilizing the required physical storage address for retrieving the required written data;
    (iii) otherwise if the required point-in-time is earlier than the second point in time:
      a. determine, using the first index region of the index, if the first log region includes one or more matching first written data having a first physical storage object address equal to the required physical storage object address and the first write time data earlier than, or equal to, the required point-in-time, and if in the affirmative, a fourth criterion is met;
      b. in response to meeting the fourth criterion, retrieve the matching first written data having the first write time data indicating the most recent time earlier than the required point-in-time from the first log region, the matching first written data being the required written data;
      c. otherwise, in case the fourth criterion is not met, access the third memory utilizing the required physical storage address for retrieving the required written data.

According to certain examples, the required written data is not logged in the log, and wherein the criterion being met in the case that the outgoing edge points at the required written data; the processor is further configured to retrieve the required written data from the third memory utilizing the another required physical storage object address.

According to certain examples, the criterion being met in the case that the required routing data being matching third routing data or matching fourth routing data retrieved from the third memory, the processor is further configured to perform the following (AAA):
  (i) retrieve the required routing data from the third memory utilizing the required physical storage object address; the retrieved required routing data being the given vertex;
  (ii) search in the given vertex for another outgoing edge, including comparing the given key with at least one navigation key of the navigation keys of the given vertex and identifying another key range, of the key ranges, that is associated with the navigation key and which encompasses the given key; the another outgoing edge being associated with the identified key range; the another outgoing edge being a certain required physical storage object address and points at a child vertex of the given vertex or at the required written data;
  (iii) repeat a second cycle of calculation of steps (AAA)(i) and (AAA)(ii) as many times as required until another criterion is met, wherein:
    the cycle in step (AAA)(i) utilizes the certain required physical storage address obtained in step (AAA)(ii) of the previous cycle of calculation, for obtaining a certain retrieved required routing data being the child vertex that is being pointed at by the outgoing edge obtained in step (AAA)(ii) of the previous cycle;

the cycle in step (AAA)(ii) includes searching the child vertex retrieved in (AAA)(i);

the another criterion being that the another outgoing edge points at the required written data the required written data;

(iv) retrieve the required written data from the third memory utilizing the certain required physical storage object address.

According to certain examples, the read request further includes a given snapshot having a given MF root vertex, and wherein the incoming edge is an outgoing edge of the given MF root vertex.

According to certain examples, the first memory is a secondary memory.

According to certain examples, the first index region is stored on the first memory and the second index region is stored on a second memory.

According to certain examples, the second memory is a primary memory.

According to certain examples, at least part of the first log region is also cached on the second memory.

According to certain examples, at least part of the second log region is also cached on the second memory.

According to certain examples, the index is a single index having the first index region and the second index region.

According to certain examples, the index includes at least two distinct indexes, at least a first index of the distinct indexes constitutes the first index region and at least a second index of the distinct indexes constitutes the second index region.

According to certain examples, the third memory is the secondary memory.

According to certain examples, the third memory is a second secondary memory.

According to certain examples, the data structure provides Continuous Data Protection (CDP).

According to certain examples, the CDP has a Zero Recovery Time Objective.

According to certain examples, the first write time data is a generation number or a write time timestamp.

According to certain examples, the second write time data is a generation number or a write time timestamp.

According to certain examples, there is provided at least one non-transitory computer readable medium comprising computer readable instructions that control at least one processor to implement the method of claim 3.

According to certain examples, there is provided at least one non-transitory computer readable medium comprising computer readable instructions that control at least one processor to implement the method of claim 5.

According to certain examples, there is provided a computerized system comprising: a processor; and a computer-readable non-transient memory in communication with the processor, the memory storing instructions that when executed manage a Continuous Data Protection (CDP) data structure that provides CDP with a Zero Recovery Time Objective, the CDP data structure includes: a base snapshot acquired at a first point in time; a log having a first log region and a second log region, the log being associated with an index having a first index region and a second index region wherein the first index region indexes the first log region and the second index region indexes the second log region; the first log region comprising first information of a first sequence of write operations performed after the first point-in-time and on or before a second point-in-time; the first index region facilitating access to the first information or part thereof; the second log region comprising second information of a second sequence of write operations performed after the second point-in-time; the second index region facilitating access to the second information or part thereof; wherein the second index region is stored on a portion of a primary memory and wherein the index includes more information that can be stored on the portion of the primary memory; whereby the CDP data structure enables, in response to a request to read written data, the request including a required physical storage object address of the written data and a required point-in-time, retrieving content of the required physical storage object address at the required point-in-time, by accessing the first log region or the second log region through the respective first index region or second index region, wherein the accessing is dependent on a relation between the required point-in-time and one or more of the first point in time and the second point in time, and wherein in case the written data is not found in the respective log, retrieving the written data from a secondary memory, thereby obtaining the CDP with the Zero Recovery Time Objective.

In accordance with certain examples of the presently disclosed subject matter, there is provided a method for creating a plurality of mapping functions (MFs) of an addressable data space, the MFs being implemented using a tree data structure wherein each MF is associated with a distinct MF root vertex, the method comprising: providing a parent MF root vertex wherein the parent MF root vertex is a root of an existing MF of an addressable data space and wherein the parent MF root vertex having parent MF root vertex data including one or more edges connecting the parent MF root vertex to one or more respective child vertex thereof; receiving a create new MF command including an indication of the parent MF root vertex; creating a new MF root vertex; creating a copy of at least part of the parent MF root vertex data to the new MF root vertex, the part including at least one given edge of the edges; and for at least one given vertex pointed at by the at least one given edge, increasing a respective reference counter associated therewith and indicative of the number of vertices pointing thereto, the reference counter being stored in a counter manager.

According to certain examples, the counter manager is an internal counter manager, internal to the at least one given vertex.

According to certain examples, the counter manager is an external counter manager, external to the parent MF root vertex.

According to certain examples, the MF root vertex data further includes at least one key of one or more keys, the keys being indicative of a value range of the sub-tree spanned by the vertex pointed at by the respective edge.

According to certain examples, the parent MF root vertex data further includes the reference counter.

According to certain examples, the part includes the at least one key and the at least one edge.

According to certain examples, the method further comprises: receiving a command causing a modification of a vertex reachable from the new MF root vertex; if the vertex is reachable from at least one additional MF root vertex, creating a clone of the vertex and all vertices on the path from the new MF root vertex which are reachable from the at least one additional MF and have not been cloned, if any, giving rise to vertices clones; and for each vertex clone of the vertices clones, having one or more vertex clone edges pointing at a cloned vertex, updating the vertex clone edges to point at the clone of the cloned vertex.

According to certain examples, the method further comprises, for each un-cloned vertex pointed at by an edge of a vertex clone of the vertices clones, increasing the un-cloned vertex's respective reference counter associated therewith and indicative of the number of vertices pointing thereto.

According to certain examples, the method further comprises, for each vertex clone of the vertices clones, pointed at by an edge that previously pointed at the cloned vertex from which the vertex clone was cloned, decreasing the respective reference counter associated with the cloned vertex from which the vertex clone was cloned.

According to certain examples, the method further comprises: receiving a delete MF command including an indication of a vertex to delete; and deleting all vertices reachable from the vertex to delete that are not reachable from any other MF of the MFs.

According to certain examples, the method further comprises, for each deleted vertex, decreasing the respective reference counter associated with each vertex pointed at by the deleted vertex, if any.

According to certain examples, the parent MF root vertex data further includes the reference counter and further comprising deleting each deleted vertex in case the reference counter associated therewith is zeroed and it does not contain any shared reference counters.

According to certain examples, the method further comprises handing over the shared reference counters of each deleted vertex having a number of shared reference counters below a reference counters transfer threshold.

According to certain examples, for each reference counter pointed at by one or more vertices of a single leader-MF the reference counter is handed over to a selected vertex pointing at the reference counter.

According to certain examples, for each reference counter pointed at by one or more vertices of two or more leader-MFs of the MFs, the reference counter is handed over to a selected vertex within a selected leader-MF of the two or more leader-MFs pointing at the reference counter.

According to certain examples, the method further comprises cloning the selected vertex to other MFs of the leader-MFs pointing at the reference counter and calculating an updated reference counter for each other leader-MF of the other MFs.

According to certain examples, each MF of the MFs is a snapshot of a logical unit.

According to certain examples, a time complexity of searching the tree data structure is constant irrespective of the number of existing MFs of the addressable data space.

In accordance with certain examples of the presently disclosed subject matter, there is further provided a method for creating a plurality of mapping functions (MFs) of an addressable data space, the MFs being implemented using a tree data structure wherein each MF is associated with a distinct MF root vertex, the method comprising: providing a parent MF root vertex wherein the parent MF root vertex is a root of an existing MF of an addressable data space and wherein the parent MF root vertex having parent MF root vertex data including at least one reference to a counter manager vertex, wherein the counter manager vertex comprises at least one reference counter indicative of a number of vertices pointing at a respective child vertex of the parent MF root vertex; receiving a create new MF vertex command including an indication of the parent MF root vertex; creating a new MF root vertex; creating a copy of at least part of the parent MF root vertex data to the new MF root vertex, the part including at least one of the at least one reference; and for at least the respective child vertex, increasing a respective reference counter within the counter manager vertex.

According to certain examples, the method further comprises: receiving a command causing a modification of a vertex reachable from the new MF root vertex; if the vertex is reachable from at least one additional MF root vertex, creating a clone of the vertex and all vertices on the path from the new MF root vertex which are reachable from the at least one additional MF and have not been cloned, if any, giving rise to vertices clones; and for each vertex clone of the vertices clones, having one or more vertex clone edges pointing at a cloned vertex, updating the vertex clone edges to point at the clone of the cloned vertex.

According to certain examples, the method further comprises, for each un-cloned vertex pointed at by an edge of a vertex clone of the vertices clones, increasing the un-cloned vertex's respective reference counter associated therewith and indicative of the number of vertices pointing thereto.

According to certain examples, the method further comprises, for each vertex clone of the vertices clones, pointed at by an edge that previously pointed at the cloned vertex from which the vertex clone was cloned, decreasing the respective reference counter associated with the cloned vertex from which the vertex clone was cloned.

According to certain examples, the method further comprises: receiving a delete MF command including an indication of a vertex to delete; and deleting all vertices reachable from the vertex to delete that are not reachable from any other MF of the MFs.

According to certain examples, the method further comprises, for each deleted vertex, decreasing the respective reference counter associated with each vertex pointed at by the deleted vertex, if any.

According to certain examples, the method further comprises deleting each deleted vertex in case the reference counter associated therewith is zeroed and it does not contain any shared reference counters.

According to certain examples, the method 25 further comprises handing over the shared reference counters of each deleted vertex having a number of shared reference counters below a reference counters transfer threshold.

According to certain examples, for each reference counter pointed at by one or more vertices of a single leader-MF the reference counter is handed over to a selected vertex pointing at the reference counter.

According to certain examples, for each reference counter pointed at by one or more vertices of two or more leader-MFs of the MFs, the reference counter is handed over to a selected vertex within a selected leader-MF of the two or more leader-MFs pointing at the reference counter.

According to certain examples, the method further comprises cloning the selected vertex to other MFs of the leader-MFs pointing at the reference counter and calculating an updated reference counter for each other leader-MF of the other MFs.

According to certain examples, each MF of the MFs is a snapshot of a logical unit.

According to certain examples, a time complexity of searching the tree data structure is constant irrespective of the number of existing MFs of the addressable data space.

In accordance with certain examples of the presently disclosed subject matter, there is yet further provided a system for creating a plurality of mapping functions (MFs) of an addressable data space, the MFs being implemented using a tree data structure wherein each MF is associated with a distinct MF root vertex, the system including at least one processor configured to: provide a parent MF root vertex wherein the parent MF root vertex is a root of an existing MF of an addressable data space and wherein the parent MF root vertex having parent MF root vertex data including one or more edges connecting the parent MF root vertex to one or more respective child vertex thereof; receive a create new MF command including an indication of the parent MF root vertex; create a new MF root vertex; create a copy of at least part of the parent MF root vertex data to the new MF root vertex, the part including at least one given edge of the edges; and for at least one given vertex pointed at by the at least one given edge, increase a respective reference counter associated therewith and indicative of the number of vertices pointing thereto, the reference counter being stored in a counter manager.

According to certain examples, the counter manager is an internal counter manager, internal to the at least one given vertex.

According to certain examples, the counter manager is an external counter manager, external to the parent MF root vertex.

According to certain examples, the MF root vertex data further includes at least one key of one or more keys, the keys being indicative of a value range of the sub-tree spanned by the vertex pointed at by the respective edge.

According to certain examples, the parent MF root vertex data further includes the reference counter.

According to certain examples, the part includes the at least one key and the at least one edge.

According to certain examples, the processor is further configured to: receive a command causing a modification of a vertex reachable from the new MF root vertex; if the vertex is reachable from at least one additional MF root vertex, create a clone of the vertex and all vertices on the path from the new MF root vertex which are reachable from the at least one additional MF and have not been cloned, if any, giving rise to vertices clones; and for each vertex clone of the vertices clones, having one or more vertex clone edges pointing at a cloned vertex, update the vertex clone edges to point at the clone of the cloned vertex.

According to certain examples, the processor is further configured, for each un-cloned vertex pointed at by an edge of a vertex clone of the vertices clones, to increase the un-cloned vertex's respective reference counter associated therewith and indicative of the number of vertices pointing thereto.

According to certain examples, the processor is further configured, for each vertex clone of the vertices clones, pointed at by an edge that previously pointed at the cloned vertex from which the vertex clone was cloned, to decrease the respective reference counter associated with the cloned vertex from which the vertex clone was cloned.

According to certain examples, the processor is further configured to: receive a delete MF command including an indication of a vertex to delete; and delete all vertices reachable from the vertex to delete that are not reachable from any other MF of the MFs.

According to certain examples, the processor is further configured, for each deleted vertex, to decrease the respective reference counter associated with each vertex pointed at by the deleted vertex, if any.

According to certain examples, the parent MF root vertex data further includes the reference counter and wherein the processor is further configured to delete each deleted vertex in case the reference counter associated therewith is zeroed and it does not contain any shared reference counters.

According to certain examples, the processor is further configured to hand over the shared reference counters of each deleted vertex having a number of shared reference counters below a reference counters transfer threshold.

According to certain examples, for each reference counter pointed at by one or more vertices of a single leader-MF the reference counter is handed over to a selected vertex pointing at the reference counter.

According to certain examples, for each reference counter pointed at by one or more vertices of two or more leader-MFs of the MFs, the reference counter is handed over to a selected vertex within a selected leader-MF of the two or more leader-MFs pointing at the reference counter.

According to certain examples, the processor is further configured to clone the selected vertex to other MFs of the leader-MFs pointing at the reference counter and calculate an updated reference counter for each other leader-MF of the other MFs.

According to certain examples, each MF of the MFs is a snapshot of a logical unit.

According to certain examples, a time complexity of searching the tree data structure is constant irrespective of the number of existing MFs of the addressable data space.

In accordance with certain examples of the presently disclosed subject matter, there is still further provided a system for creating a plurality of mapping functions (MFs) of an addressable data space, the MFs being implemented using a tree data structure wherein each MF is associated with a distinct MF root vertex, the system including at least one processor configured to: provide a parent MF root vertex wherein the parent MF root vertex is a root of an existing MF of an addressable data space and wherein the parent MF root vertex having parent MF root vertex data including at least one reference to a counter manager vertex, wherein the counter manager vertex comprises at least one reference counter indicative of a number of vertices pointing at a respective child vertex of the parent MF root vertex; receive a create new MF vertex command including an indication of the parent MF root vertex; create a new MF root vertex; create a copy of at least part of the parent MF root vertex data to the new MF root vertex, the part including at least one of the at least one reference; and for at least the respective child vertex, increase a respective reference counter within the counter manager vertex.

According to certain examples, the processor is further configured to: receive a command causing a modification of a vertex reachable from the new MF root vertex; if the vertex is reachable from at least one additional MF root vertex, create a clone of the vertex and all vertices on the path from the new MF root vertex which are reachable from the at least one additional MF and have not been cloned, if any, giving rise to vertices clones; and for each vertex clone of the vertices clones, having one or more vertex clone edges pointing at a cloned vertex, update the vertex clone edges to point at the clone of the cloned vertex.

According to certain examples, the processor is further configured, for each un-cloned vertex pointed at by an edge of a vertex clone of the vertices clones, to increase the un-cloned vertex's respective reference counter associated therewith and indicative of the number of vertices pointing thereto.

According to certain examples, the processor is further configured, for each vertex clone of the vertices clones, pointed at by an edge that previously pointed at the cloned vertex from which the vertex clone was cloned, to decrease the respective reference counter associated with the cloned vertex from which the vertex clone was cloned.

According to certain examples, the processor is further configured to: receive a delete MF command including an indication of a vertex to delete; and delete all vertices reachable from the vertex to delete that are not reachable from any other MF of the MFs.

According to certain examples, the processor is further configured, for each deleted vertex, to decrease the respective reference counter associated with each vertex pointed at by the deleted vertex, if any.

According to certain examples, the processor is further configured to delete each deleted vertex in case the reference counter associated therewith is zeroed and it does not contain any shared reference counters.

According to certain examples, the processor is further configured to hand over the shared reference counters of each deleted vertex having a number of shared reference counters below a reference counters transfer threshold.

According to certain examples, for each reference counter pointed at by one or more vertices of a single leader-MF the reference counter is handed over to a selected vertex pointing at the reference counter.

According to certain examples, for each reference counter pointed at by one or more vertices of two or more leader-MFs of the MFs, the reference counter is handed over to a selected vertex within a selected leader-MF of the two or more leader-MFs pointing at the reference counter.

According to certain examples, the processor is further configured to clone the selected vertex to other MFs of the leader-MFs pointing at the reference counter and calculate an updated reference counter for each other leader-MF of the other MFs.

According to certain examples, each MF of the MFs is a snapshot of a logical unit.

According to certain examples, a time complexity of searching the tree data structure is constant irrespective of the number of existing MFs of the addressable data space.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 12a is an exemplary illustration of a graph containing vertex to be cloned before its cloning, in accordance with the presently disclosed subject matter;

FIG. 12b is an exemplary illustration of a graph following cloning of the vertex, in accordance with the presently disclosed subject matter;

DETAILED DESCRIPTION

Figure 1:
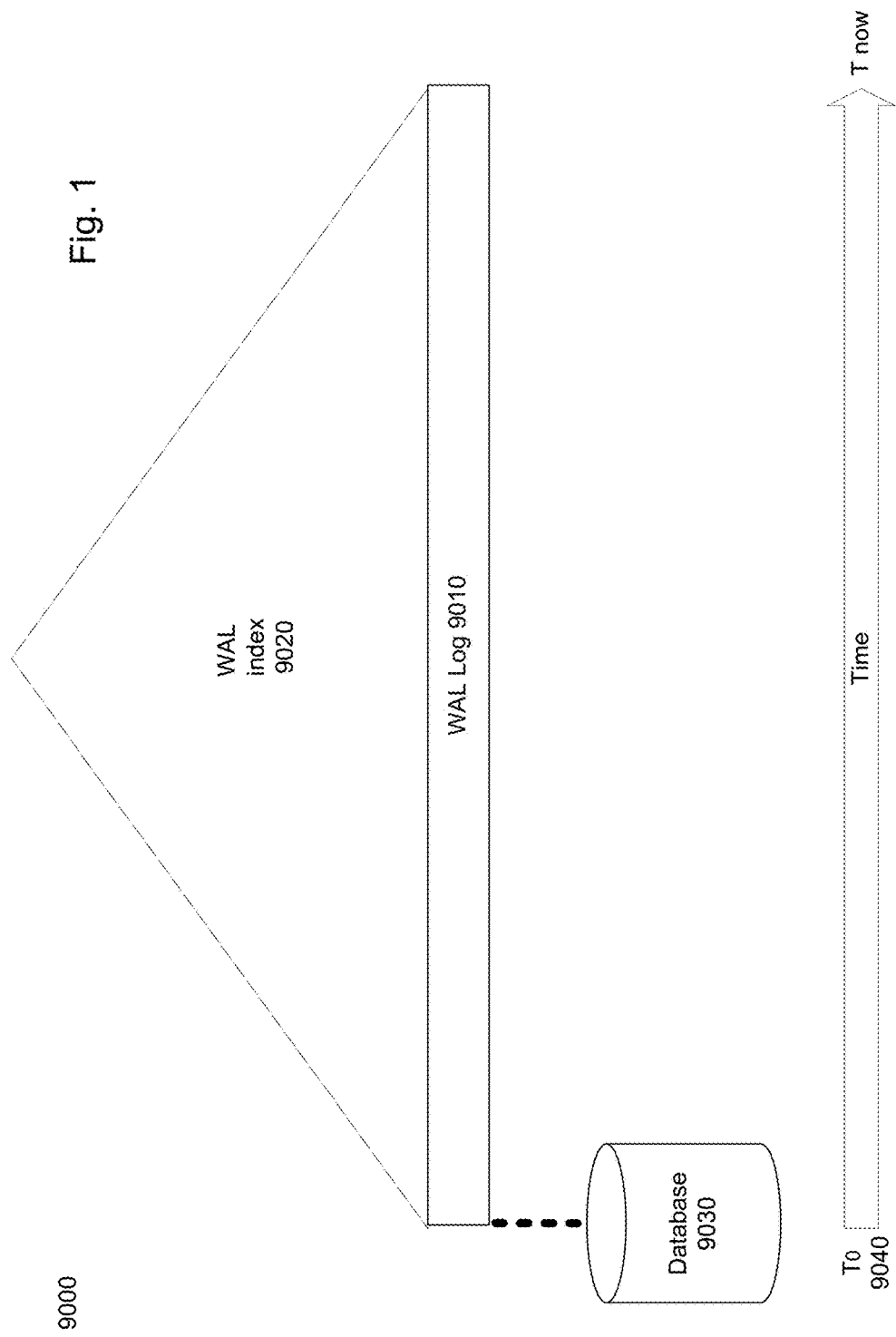
FIG. 1 is a general schematic illustration of a Write Ahead Log, in accordance with the prior art.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "updating", "writing", "calculating", "retrieving", "receiving", "determining", "accessing", "searching", "repeating", "comparing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
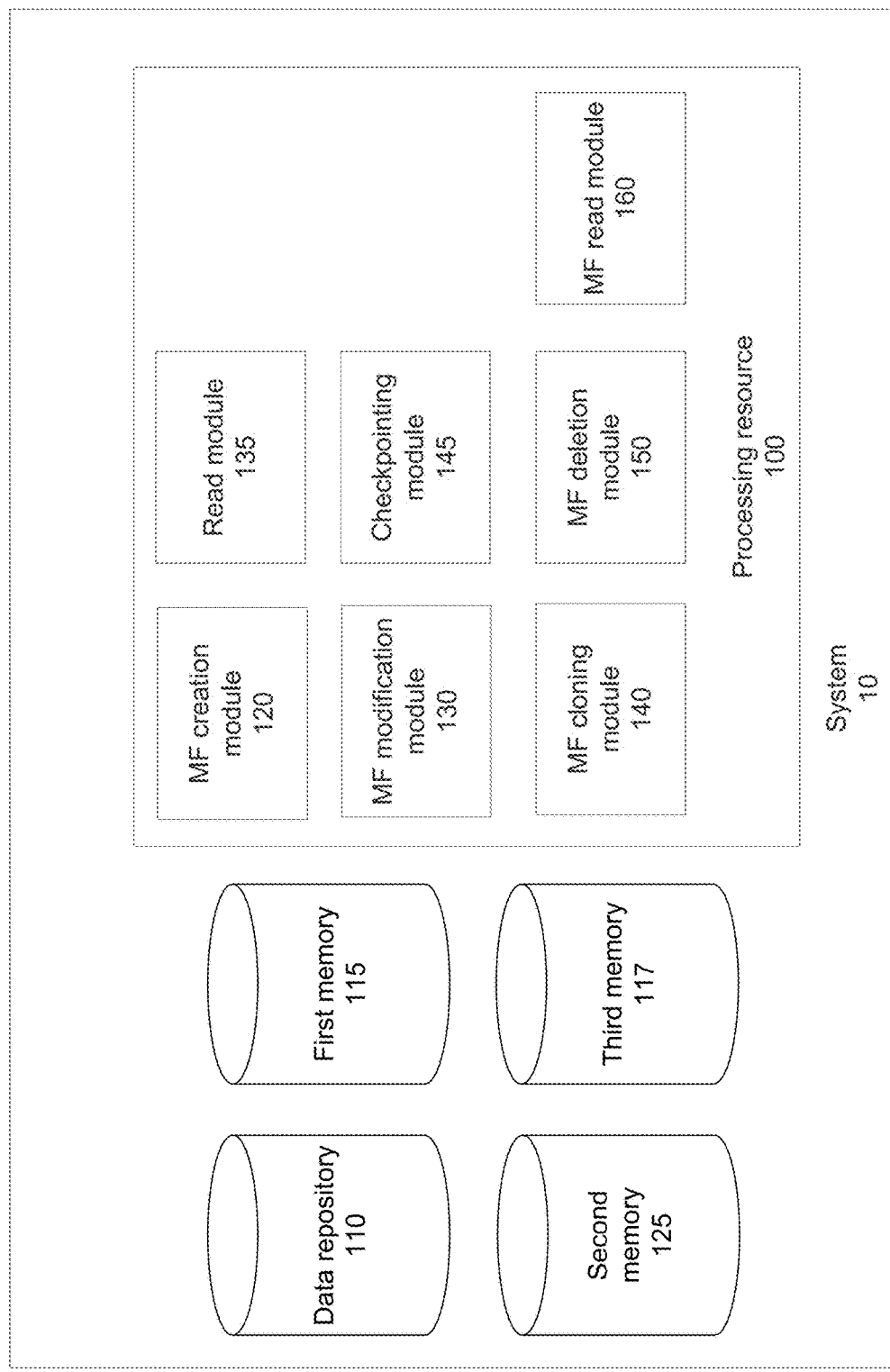
FIG. 3 is a logical block diagram schematically illustrating one example of a system for Continuous Data Protection, in accordance with the presently disclosed subject matter.

In embodiments of the presently disclosed subject matter, fewer, more and/or different stages than those shown in FIGS. 4, 5, 6a, 7, 9, 11, 13, 15, 17-22, 23a, 24 and 25 may be executed. In embodiments of the presently disclosed subject matter one or more stages illustrated in FIGS. 4, 5, 6a, 7, 9, 11, 13, 15, 17-22, 23a, 24 and 25 may be executed in a different order and/or one or more groups of stages may be executed simultaneously. FIG. 3 illustrates a general schematic of the system architecture in accordance with an embodiment of the presently disclosed subject matter. Each module in FIG. 3 can be made up of any combination of software, hardware and/or firmware that performs the functions as defined and explained herein. The modules in FIG. 3 may be centralized in one location or dispersed over more than one location. In other embodiments of the presently disclosed subject matter, the system may comprise fewer, more, and/or different modules than those shown in FIG. 3.

Bearing this in mind, attention is drawn to FIG. 1 showing a schematic illustration of a Write Ahead Log mechanism, in accordance with the prior art.

Write Ahead Logging (WAL) is known from the field of database systems. The WAL mechanism 9000 usually includes a single WAL log 9010, logging information of a sequence of operations relating to data stored on a database 9030 (e.g. write, delete), where the logged operations are operations that took place after a certain point in time (e.g., as shown in the figure, since the log was created ($T_0$ 9040) and as long as the log is logging ($T_{now}$)). In some cases, the logged information includes at least a transaction/operation ID (identifying the transaction/operation), an address (usually a physical disk address) and the new value (to be stored at the corresponding address).

The operations are logged before they are applied to the database 9030. A checkpointing process is also used in the WAL mechanism, in which one or more of the oldest logged operations are applied to the database 9030, and subsequently removed from the WAL log 9010. Therefore, in most cases, the WAL log 9010 logs a relatively small amount of operations performed within a short time frame, usually of up to several seconds or minutes.

The WAL log 9010 is usually indexed with a single WAL index 9020 (e.g. a hash table or a tree data structure of some sort such as a b-tree, etc.) that enables retrieval of logged information relating to operations that have yet been checkpointed from within the WAL log 9010. The index is usually stored on a primary memory, for enabling fast access to the logged information. The fact that the WAL log 9010 logs a small amount of operations, enables storing the WAL index 9020 on the primary memory. Therefore, the WAL log 9010 is required to be of a sufficient small size that will enable its WAL index 9020 to be stored on the primary memory.

It can be appreciated that in case one would desire to increase the WAL log 9010 period and/or the log size, the WAL index 9020 will require a large amount of primary memory, and the primary memory is usually of limited size and more expensive in comparison to secondary memories (an explanation about the distinction between primary and secondary memories is provided herein below).

One solution could be to store the WAL index 9020 on a secondary memory, however, this will obviously result in degraded performance as the speed of reading from the WAL log 9010 will substantially decrease.

Another solution could be to split the WAL index 9020 into two indexes, one relatively small index, stored on the primary memory, for a certain amount of the most recent operations and another relatively large index, stored on the secondary memory, for older operations. Such solution will result, in most cases, in degraded performance as the speed of reading from the part of the WAL log 9010 that is indexed by the index stored on the secondary memory will substantially decrease (as it will be stored on the secondary memory). It can be appreciated that as the index stored on the secondary memory covers the larger part of the WAL log 9010, most reads will statistically be directed at that part of the log, as they will not be found in the smaller portion covered by the index stored on the primary memory. For such reads it is necessary to check the secondary memory index even just for deciding that the required data does not exist in the WAL log 9010 and should therefore be read from the database 9030.

Figure 2:
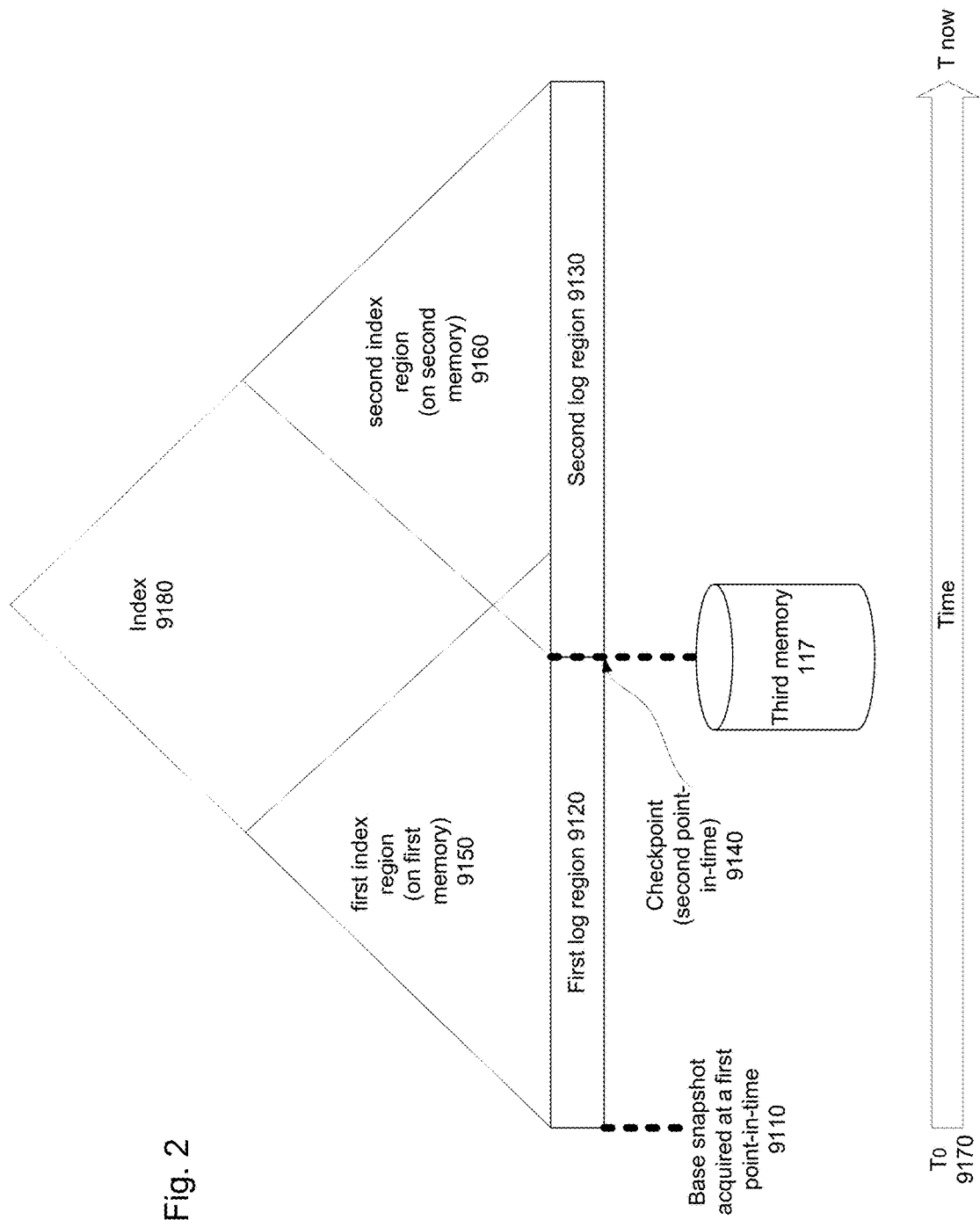
FIG. 2 is a general schematic illustration of a Continuous Data Protection (CDP) data structure, in accordance with the presently disclosed subject matter.

Having described the Write Ahead Log mechanism, in accordance with the prior art, attention is now drawn to FIG. 2, showing a schematic illustration of a Continuous Data Protection (CDP) data structure, in accordance with the presently disclosed subject matter.

The CDP data structure in accordance with the presently disclosed subject matter comprises a read-only base snapshot 9110 of an addressable data space (that can be stored on a third memory 117), acquired at a first point in time. The base snapshot provides a mapping between the logical storage object addresses and the corresponding physical storage object addresses at the first point-in-time. It is to be noted that after acquiring the base snapshot, the physical storage objects stored on the physical storage object addresses become read-only. In snapshot tree scenarios, in which multiple parallel snapshots can be acquired, multiple such base snapshots may be required to attain the required properties for all tree branches, where the log for each branch effectively starts at the time its corresponding base snapshot was taken/acquired.

The CDP data structure further comprises a log having a first log region 9120 and a second log region 9130. The first log region 9120 can comprise first information of a first sequence of write operations (whose destination is the addressable data space) performed after the first point-in-time (in which the snapshot was acquired—T0 9170) and before a second point-in-time, later than the first point-in-time. The second log region 9130 can comprise second information of a second group of write operations (whose destination is the addressable data space) performed after said second point-in-time.

Figure 4:
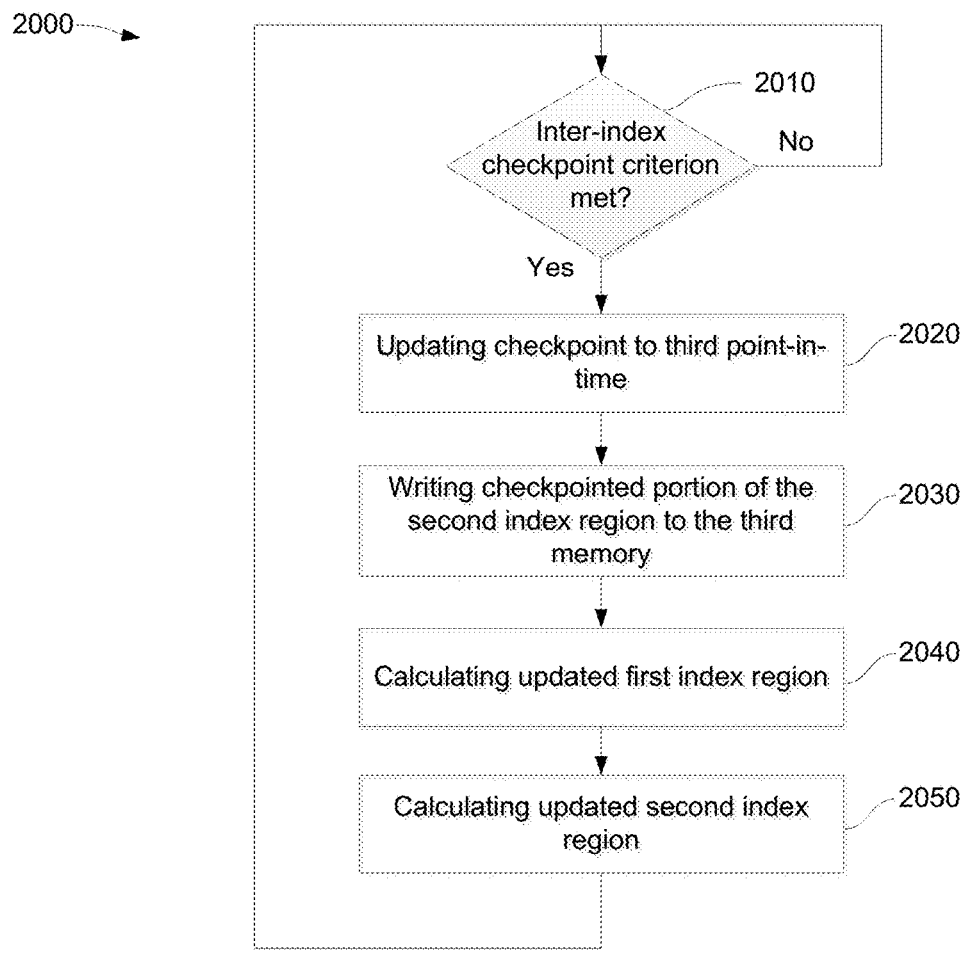
FIG. 4 is a flowchart illustrating one example of a sequence of operations carried out for updating a checkpoint in the CDP data structure, in accordance with the presently disclosed subject matter.

The second point-in-time can be defined, explicitly or implicitly, by a dynamic checkpoint 9140 that can be updated as further detailed herein, inter alia with reference to FIG. 4. As will be explained herein below, in some cases, upon updating of the checkpoint to a third point-in-time (that is later than the second point-in-time), any logged write operation performed after the second point-in-time and before the third point-in-time can be applied to the addressable data space (that can be stored on a third memory 117, as further detailed herein with reference to FIG. 3).

It is to be noted that in some cases the checkpoint can define a certain moment/point in time (in such cases the dynamic checkpoint explicitly defines the second point-in-time, e.g. by a timestamp), and in other cases the checkpoint can define a certain generation number (in such cases the dynamic checkpoint implicitly defines the second point-in-time). It is to be noted that a generation number can be a unique sequential (or any other ordered value) identifier that is associated with each, or only with certain type/s, of the write operations (e.g. only with write operations pertaining to the actual written data which is the data provided by data-write and data-update operations for the system 10 to store, and excluding write operations pertaining to metadata which is generated by the system 10, etc.).

It is to be further noted that information of write operations performed on the second point-in-time (defined by the checkpoint) can be stored on the first log region 9120 or on the second log region 9130, mutatis mutandis.

It is to be still further noted that a write operation can include writing data to a certain physical storage object address as a result of any operation, including data-write, data-update, and data-delete. It is to be noted that in some cases, a write operation can pertain to the actual written data (the data provided by data-write and data-update operations for the system 10 to store), to metadata (generated by the system 10) related to the written data (e.g. routing data enabling direct or indirect access to the actual written data, as further detailed herein), to metadata (generated by the system 10) related to the data structure on which the written data is stored, etc.

In some cases, the first information can include, for each write operation of the first sequence of write operations, at least first routing data facilitating direct or indirect access to first written data. The first routing data can be, for example, a physical block address of the first written data or a vertex of a mapping function that facilitates access thereto, as further detailed herein. Each write operation of the first sequence of write operations can be associated with first write time data indicative of a position of the write operation within the first sequence. In some cases, the write operations of the first sequence of write operations can become associated with the first write time data after a commit command is received (in such cases, the first write time data of such write operations can be the timestamp of the commit time or a generation number associated with the commit command). The first write time data can be stored, for example, on the first log region 9120 and/or on a first index region 9150 of an index 9180 with which the log is associated. The index 9180 is designed to improve the speed of looking up data logged in the log.

In some cases, the second information can include, for each write operation of the second group of write operations, at least second routing data facilitating direct or indirect access to second written data. The second routing data can be, for example, a physical block address of the second written data or a vertex of a mapping function that facilitates access thereto, as further detailed herein. Each write operation of the second sequence of write operations can be associated with second write time data indicative of a position of the write operation within the second sequence. In some cases, the write operations of the second sequence of write operations can become associated with the second write time data after a commit command is received (in such cases, the second write time data of such write operations can be the timestamp of the commit time or a generation number associated with the commit command). The second write time data can be stored, for example, on the second log region 9130 and/or on a second index region 9160 of the index 9180.

It is to be noted that in some cases, the first information can also include the first written data itself and/or the second information can also include the second written data itself. In other cases the log does not log the actual written data.

It is to be noted that in some cases, there is no need in logging the actual data, for example in cases where the system 10 utilizes redirect-on-write mechanisms, in which whenever a certain logical storage object (having a certain logical storage object address) is overwritten, a new physical storage object is allocated thereto, having a different physical storage object address, and the mapping between the logical and physical storage object addresses are updated to point at the new physical storage object address. If the system 10 utilizes copy-on-write mechanisms, in which whenever a certain logical storage object (having a certain logical storage object address) is overwritten, the previous data located at the physical storage object address is overwritten, there may be (e.g. in cases the overwritten data would otherwise not be lost) a need in logging the actual written data and/or the previous data.

In some cases, the first write time data and/or the second write time data can be a write time timestamp indicative of the time at which the corresponding write operation was performed. In other cases, the first write time data and/or the second write time data can be a generation number associated with the corresponding write operation. It can be appreciated that both a write time timestamp and a generation number can enable determination of a relative position of the corresponding write operation within the sequence of write operations. It is to be noted that the write time timestamp and the generation numbers are mere examples, and any other alternative that enable determination of a relative position of the corresponding write operation within the sequence of write operations can be used, mutatis mutandis.

The log can be associated with an index 9180, having a first index region 9150 and a second index region 9160. In some cases, the first log region 9120 can be associated with the first index region 9150 of the index 9180, which facilitates access at least to the first information (or part thereof) and the second log region 9130 can be associated with the second index region 9160 of the index 9180, which facilitates access at least to the second information (or part thereof).

In some cases, the index 9180, having the first index region 9150 and the second index region 9160, can be a single index, and in such cases, the distinction between the first index region 9150 and the second index region 9160 is logical. Various index types can support such logical distinction between index regions. An example of such index structure can be a data structure that maintains a timestamp dividing the first and second log regions (each of which is indexed by a different part of the index) and the decision whether to use the first part of the index or the second part of the index will be taken in accordance with the timestamp. More specifically, a tree with a binary root can be maintained, in which the left sub-tree and the right sub-tree may be stored on a different kind of memory (primary/secondary), and the timestamp can be used in order to navigate to the left sub-tree or the right sub-tree.

In other cases, the index 9180 can include at least two distinct indexes, where at least one of the distinct indexes constitutes the first index region 9150 and at least one other index of the distinct indexes constitutes the second index region 9160. It can be appreciated that the distinct indexes can be, for example, b-tree indexes, a hash table indexing sequences of changes to physical block addresses using the physical block address as key. In some cases, the at least two of the distinct indexes can be indexes of different types (e.g. one index can be a b-tree and the other index can be a hash table indexing sequences of changes to physical block addresses using the physical block address as key, etc.).

It is to be noted that in some cases, upon updating the checkpoint (as detailed herein above), the first index region 9150 and the second index region 9160 can be updated to index the updated first log region and the updated second log region (that, as indicated above, are defined inter alia by the checkpoint) respectively. It is to be further noted that in other cases, there is no need in updating the first index region 9150 and the second index region 9160. It is to be still further noted that upon logging of data relating to a new write operation, the second index region 9160 can be updated to include also reference to the data relating to the new write operation in the log.

According to some examples of the presently disclosed subject matter, the first index region 9150 can be stored on a secondary memory and the second index region 9160 can be stored on a primary memory, as further detailed herein. In some cases, part of the second index region can also be cached on a primary memory, as further detailed herein. It is to be noted that in some cases, when the second index region 9160 is stored on a primary memory, the index 9180 can include more information than can be stored on the portion of the primary memory allocated to the second index region 9160.

The CDP data structure provided herein can enable recovery of information of any write operation, including the data that was written therein, at any point in time after the time the base snapshot was acquired. In addition, the Continuous Data Protection data structure provided herein can enable continuous data protection with zero, or substantially zero, Recovery Time Objective (RTO), i.e. the duration of time needed to set-up recovery of data as of any given point in time is zero, or substantially zero.

FIG. 3 is a logical block diagram schematically illustrating one example of a system for continuous data protection utilizing the CDP data structure, in accordance with the presently disclosed subject matter.

According to some examples of the presently disclosed subject matter, the system 10 can comprise one or more processing resources 100. The one or more processing resources 100 can be processing units, microprocessors, microcontrollers or any other computing devices or modules, including multiple and/or parallel and/or distributed processing units, which are adapted to independently or cooperatively process data for controlling relevant system 10 resources and for enabling operations related to system 10 resources. It can be appreciated that system 10 and/or any of its components, can be distributed between a plurality of interconnected computerized devices (e.g. connected over one or more computer networks).

According to some examples of the presently disclosed subject matter, system 10 can be associated with a first memory 115 and a third memory 117. In some cases, the first memory 115 and/or the third memory 117 can be secondary memories that are not accessed directly by the processing resources 100. Such secondary memories can be, for example, one or more magnetic disks, one or more flash memories (e.g. flash drives, solid state drives, etc.), one or more optical discs, one or more magnetic tapes, etc., or any combination thereof. It is to be appreciated that these are mere examples of secondary memories and other secondary memory devices can be utilized additionally and/or alternatively. It is to be further noted that in some cases, the first memory 115 and the third memory 117 can be the same secondary memory (in such cases the distinction between the first memory 115 and the third memory 117 in the following description is logical).

According to some examples of the presently disclosed subject matter, system 10 can be further associated with a second memory 125. In some cases, the second memory 125 can be a primary memory, directly accessible by the processing resources 100. Such primary memory can be, for example, one or more Random Access Memories (RAMs), one or more Dynamic Random Access Memories (DRAMs), one or more Static Random Access Memories (SRAMs), etc., or any combination thereof. It is to be appreciated that these are mere examples of primary memory and other primary memory devices can be utilized additionally and/or alternatively.

It is to be noted that in some cases the first memory 115 and/or the second memory 125 and/or the third memory 117 can be distributed between a plurality of interconnected computerized devices (e.g. connected over one or more computer networks).

It is to be still further noted that in some cases, the first memory 115 and/or the third memory 117 can be a primary memory (and not a secondary memory), and in specific cases it can be the same primary memory as the second memory 125 (in such cases the distinction between the first memory 115 and/or the third memory 117 and the second memory 125 in the following description is logical).

In some cases, the first memory 115 can comprise the read-only base snapshot 9110 of the addressable data space (that can be stored on a third memory 117), acquired at a first point in time and in some cases also any subsequent read-only snapshots acquired thereafter (e.g. in a snapshot tree scenario).

According to some examples of the presently disclosed subject matter, the first memory 115 can comprise the log having the first log region 9120 and the second log region 9130. In some cases parts of the log (including the first log region 9120 and the second log region 9130) can also be cached on the second memory 125 (e.g. in accordance with any memory caching mechanism).

According to some examples of the presently disclosed subject matter, the first index region 9120 can be stored on the first memory 115 and the second index region 9130 can be stored on the second memory 125. In some cases, part of the first index region 9120 can also be cached on the second memory 125 (e.g. in accordance with any memory caching mechanism).

According to some examples of the presently disclosed subject matter, the third memory 117 comprises the addressable data space on which the written data, associated with the logged data relating to the write operations are related, is stored.

According to some examples of the presently disclosed subject matter, system 10 can be associated with a data repository 110 (e.g. a database, a storage system, a memory including Read Only Memory—ROM, Random Access Memory—RAM, or any other type of memory, etc.), configured to store data, including inter alia, one or more graph data structures containing one or more Mapping Functions (MFs) that can map any addressable data space, including the addressable data space on which the written data is stored, as further detailed herein. An addressable data space is any data space that can be accessed by a computer, such as, for example, data storage, database, object space, computerized memories (including Read Only Memory—ROM, Random Access Memory—RAM, or any other type of memory), virtual memory, networked resources addresses, Uniform Resource Locators—URLs, virtual machines or any other addressable data space (physical or virtual).

In some cases, data repository 110 can be further configured to enable retrieval, update and deletion of the stored data. In some cases, data repository 110 can be distributed between two or more geographical locations. In some cases, data repository 110 can be additionally or alternatively stored on one or more logical storage entities within the system 10. In some cases, additionally or alternatively, data repository 110 can be distributed between a plurality of interconnected computerized devices (e.g. connected over one or more computer networks). In some cases, the data repository 110 can be stored on a secondary memory, and in more particular cases, it can be stored on the first memory 115 and/or on the third memory 117. In some cases, part of the data stored on the data repository 110 can also be cached (e.g. on the second memory 125).

Before continuing with FIG. 3, an explanation about the MFs will now be provided. It is to be noted that the MFs can contain data about the locations of all or part of the elements (it is to be noted that the term element/s and the term object/s are used interchangeably in the following description) stored on the addressable data space, in a searchable manner. According to some examples of the presently disclosed subject matter, a MF can be implemented by any tree data structure (e.g. as defined herein), including, but not limited to, any type of B-tree data structure (including, but not limited to, 2-3 tree, B+ tree, etc.). In some cases, all or part of the MFs can be related to one another, e.g. in parent-child relationships.

In the following description, reference is made inter alia to trees. It is to be noted that any combination of one or more tree data structure types, including tree data structure types that are known in the art, can be used (when referring to MFs) without departing from the scope of the presently disclosed subject matter. Any person of ordinary skill in the art can appreciate that as long as the principles of the tree data structure are maintained (when referring to MFs) and the appropriate computer code implementing the relevant type, or types, of tree(s) is used, the presently disclosed subject matter can be implemented, mutatis mutandis.

It is to be noted that although reference is occasionally made to tree data structures in the following description, other data structures, or any combination of more than one data structure, including data structures that are not discussed herein, can be utilized as well.

It is to be noted that the presently disclosed subject matter enables creation and management of a practically unlimited number of MFs. It is to be further noted that the presently disclosed subject matter enables creation of a MF in constant (O(1)) time (of both new MFs and MFs that are clones of existing MFs). It is to be further noted that the presently disclosed subject matter enables MF search complexity that is independent of the number of simultaneously existing MFs of a certain addressable data space.

In some cases, such MFs can form a single graph stored, for example, in the data repository 110 (that can in some cases be a secondary memory, and in more particular cases the first memory 115 and/or the third memory 117, as indicated above). In some cases the graph can be a directed acyclic graph. It is to be noted that in some cases the graph is not necessarily fully connected so that there can exist one or more couples of vertices that are not directly connected and having no route connecting them. A graph can comprise one or more vertices, and edges connecting one or more couples of vertices. It is to be noted that a root vertex in a graph is defined as a vertex with no inbound edges (no edge is pointing at the root vertex; any vertex connected to a root vertex is connected via an outbound edge, i.e. an edge pointing from the root vertex to one or more child vertices thereof only). It is to be further noted that a leaf vertex is defined as a vertex with no outbound edges (no edge is pointing from the leaf vertex to any other vertex since the leaf vertex has no child vertices).

When looking at a graph, a MF can be any sub-graph which complies with the above requirements. In other words, any tree within the graph can be a MF. It is to be still further noted that in some cases, one or more vertices can be pointed at by more than one inbound edge.

In some cases, when a child vertex is created (or at a later stage, e.g. when more than one vertex is pointing thereto), it can be associated with a reference counter indicative of the number of vertices having a reference thereto (e.g. having a pointer pointing thereto).

According to some examples of the presently disclosed subject matter, each vertex can maintain its own internal reference counter, indicative of the number of vertices having a reference thereto. In such cases, such a vertex is also referred to as an internal counter manager.

In other cases, the reference counter can be initially stored as part of the data structure of its original parent vertex (the vertex that pointed at it when it was created). In some cases, such a reference counter can be handed over to other vertices, for example as further detailed herein, inter alia with reference to FIG. 22. It is to be noted that the vertex that contains the reference counter is also referred to as the counter manager vertex (e.g. the original vertex parent or the vertex to which the reference counter was handed over to).

In some cases, when the reference counters are stored in counter manager vertices, vertices can include a reference (e.g. a pointer, an offset/address on a storage device, etc.) to the counter manager vertices associated with their child vertices, or in some cases, directly to the respective reference counter, or to a data structure containing the respective reference counter, within the counter manager vertex. Such implementation is relatively space efficient since each vertex can maintain a single reference for each child vertex thereof. However, it is to be noted that accessing a child vertex from a vertex that is not its counter manager vertex requires additional access to the child vertex's counter manager vertex (that maintains the actual reference to the child vertex).

It is to be noted that, in some cases, the vertices can maintain a reference to the respective child vertex (with which the reference counter is associated) in addition to the reference pointing at the respective child vertex's counter manager vertex. Such implementation can enable faster traversal (as no access to the counter manager vertex is required during traversal). However, for that purpose, two references are maintained (in comparison to the single reference maintained in the above implementation).

In additional or alternative cases, the reference counter/s can be stored in any other location, and in any other data structure, such as in an independent table of counters with or without references to their respective vertices, etc. (and in such cases, such other location can be referred to as an external counter manager). It is to be noted that in the following description, when reference is made to a counter manager, it can be either one of an internal counter manager, an external counter manager or a counter manager vertex, according to the context. It is to be further noted that in some cases, according to the context, any one of the internal counter manager, external counter manager and the counter manager vertex can be used, mutatis mutandis.

In still additional or alternative cases, the reference counter/s can be stored in any other location and in any other data structure, used by the counter manager, such as in an independent table of counters with or without references to their respective vertices, etc.

Looking at the graph vertices, it is to be noted that each vertex can contain, inter alia, navigation keys (also referred to as "keys" interchangeably) and outbound edges referencing its child vertex or vertices, and in some cases, also one or more reference counters pertaining to its child vertices as detailed herein. In addition, each vertex can contain additional data referred to as vertex data. The vertex data can include, inter alia, cache information, various flags, identifiers pertaining to external address spaces, version numbers, synchronization objects, execution queues, or any other type of data, including various types of metadata, inter alia as further detailed herein.

In some cases, when looking at a graph comprising more than one MF, each MF can represent a snapshot of the addressable data space, taken at a certain point in time.

In addition, it is to be noted that in some cases a MF can be either a read only MF (e.g. a read only snapshot) or a writeable MF (e.g. an active snapshot).

It is to be noted that when a new MF is created (e.g. a snapshot of an addressable data space is acquired) it can be created either as an empty root vertex (e.g. an initial snapshot) or as a root vertex with a copy of another MF's root vertex keys and edges as further detailed herein. In some cases, when a new MF is created as a root vertex with a copy of another MF's root vertex navigation keys and edges, the MF from which the root vertex navigation keys and edges were copied becomes a read only MF (it can, for example, be marked as such by setting a flag, etc.), thus preventing any change to the tree spanned by it. In some cases all of the vertices within the tree spanned by the MF from which the root vertex navigation keys and edges were copied also become read only (they can, for example, be marked as such by setting a flag, etc.). In some cases such read only status of the MF from which the root vertex navigation keys and edges were copied can be maintained at least as long as one or more vertices of the MF from which the root vertex edges were copied is accessible through more than one MF root vertex.

Figure 11:
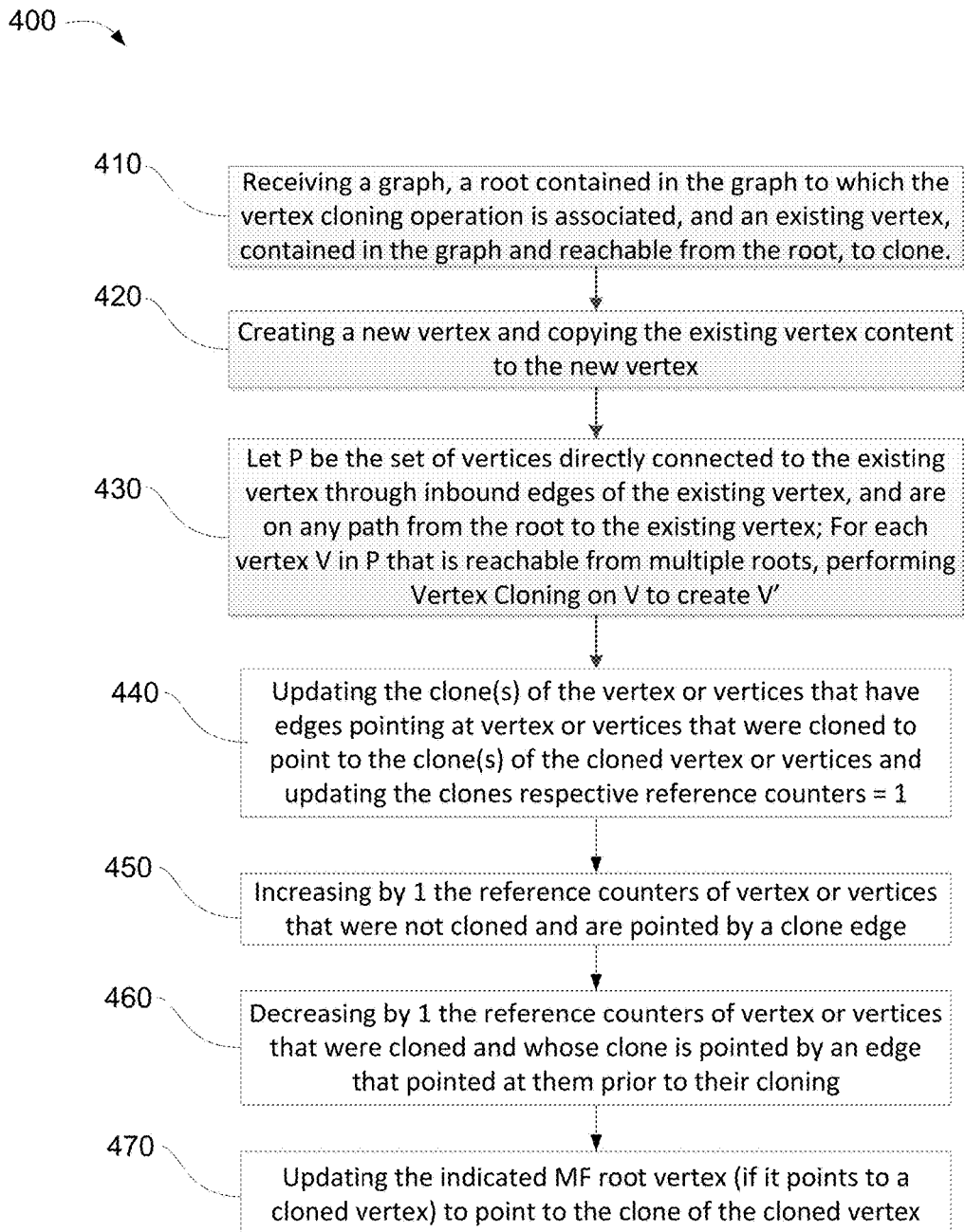
FIG. 11 is a flowchart illustrating one example of a sequence of operations carried out for cloning a non-root vertex in a graph, in accordance with the presently disclosed subject matter.

It is to be further noted that in some cases, while a vertex is accessible through more than one MF root vertex, meaning that it is shared by multiple such MFs, in cases where it is required to modify such a vertex, prior to such modification the vertex is cloned to the MF to which the change relates, as further detailed herein, inter alia with reference to FIG. 11.

When reference is made to accessibility of a certain vertex through a MF root vertex it means that there is at least one route leading from the MF root vertex to that vertex. It can be appreciated that the MF root vertex has outbound edges leading to its child vertices that, in turn, also have outbound edges leading to their children and so forth until the entire tree spanned by such MF root vertex can be searched to see if it contains a route leading from the MF root vertex to that vertex (in which case such vertex is accessible from the MF root). Each outbound edge is associated with a key-range defined by the navigation keys of the MF root vertex or the child vertices thereof or their children and so forth, respectively, as further detailed herein.

It is to be noted, for exemplary purposes and while noting that any tree data structure can be used, when looking at a 2-3 B+-tree an explanation about searching the tree, and performing other operations thereon such as modification, deletions, etc., can be found, for example, in *Introduction to Algorithms, Second Edition*, Thomas H. Cormen; Charles E. Leiserson; Ronald L. Rivest; Clifford Stein, or in http://www.mec.ac.in/resources/notes/notes/ds/bplus.htm which are incorporated herein by reference.

Returning to FIG. 3, according to some examples of the presently disclosed subject matter, processing resource 100 can comprise one or more of the following modules: read module 135, checkpointing module 145, MF creation module 120, MF modification module 130, MF cloning module 140, MF deletion module 150 and MF read module 160.

Figure 5:
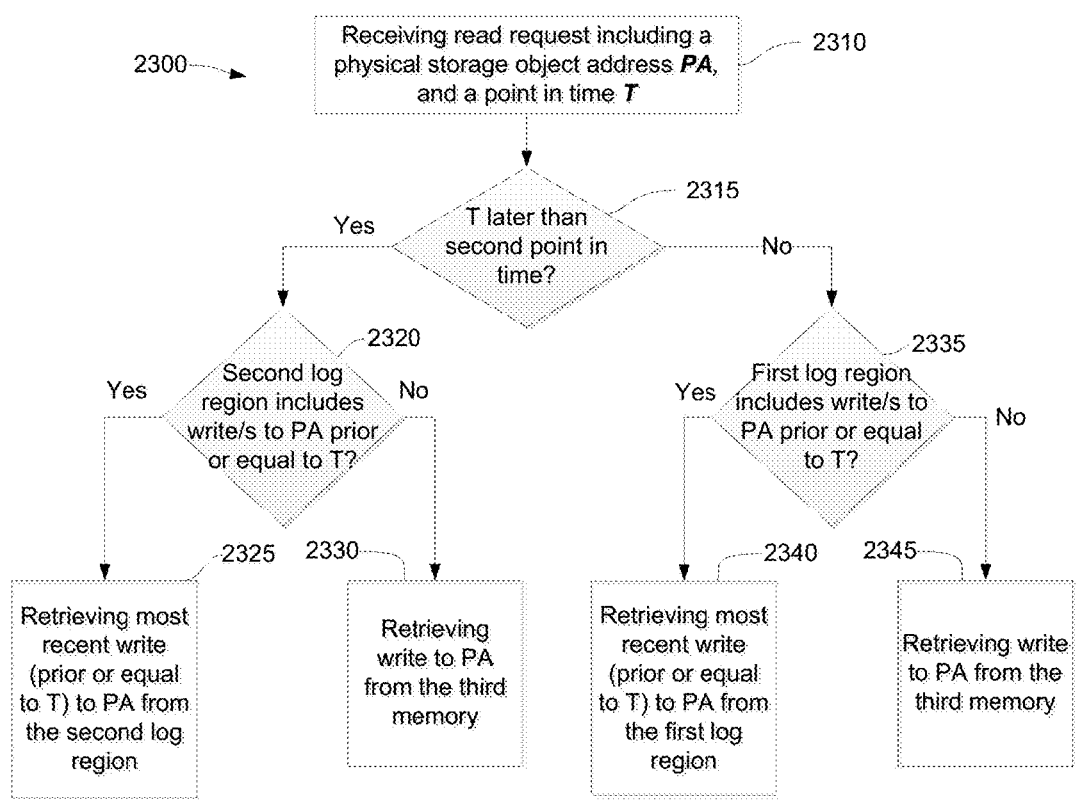
FIG. 5 is a flowchart illustrating one example of a sequence of operations carried out for reading data having a given physical storage object address, in a given point-in-time, from the CDP data structure, in accordance with the presently disclosed subject matter.

According to some examples of the presently disclosed subject matter, read module 135 can be configured to perform a process of reading an object from the CDP data structure, as further detailed herein, inter alia with respect to FIG. 5.

According to some examples of the presently disclosed subject matter, checkpointing module 145 can be configured to perform a checkpointing process, as further detailed herein, inter alia with respect to FIG. 4.

Figure 7:
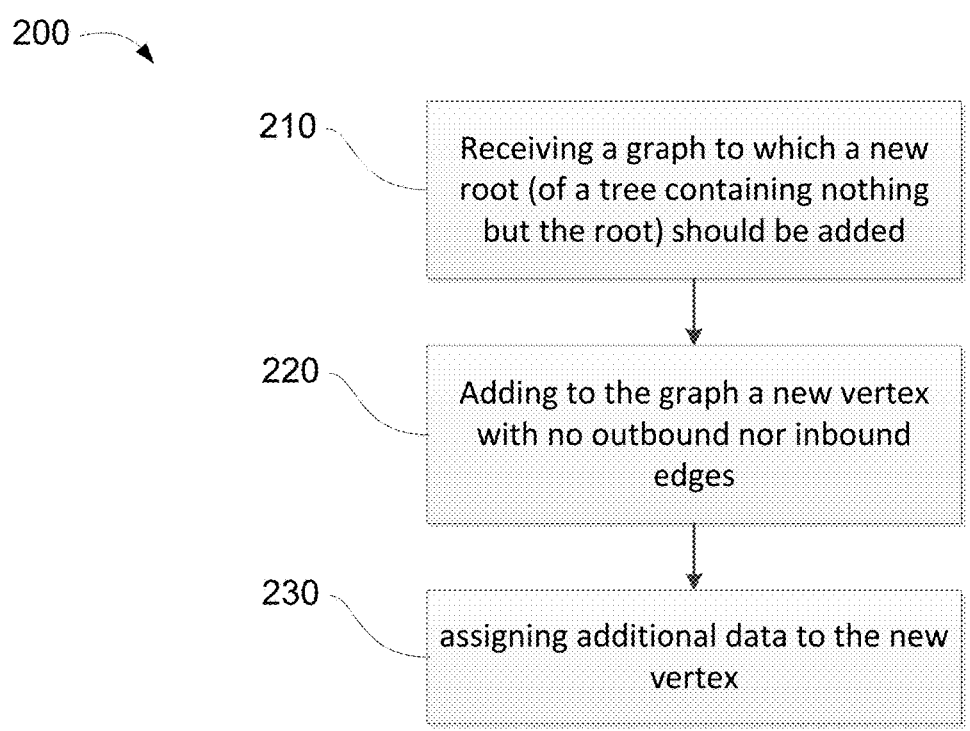
FIG. 7 is a flowchart illustrating one example of a sequence of operations carried out for creating a new Mapping Function (MF) root vertex in a graph, in accordance with the presently disclosed subject matter.
Figure 17:
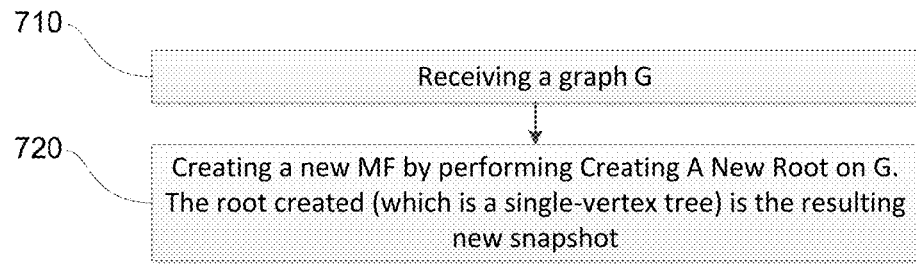
FIG. 17 is a flowchart illustrating one example of a sequence of operations carried out for creating a new data storage snapshot, in accordance with the presently disclosed subject matter.

According to some examples of the presently disclosed subject matter, the MF creation module 120 can be configured to perform a create new MF process, as further detailed herein, inter alia with reference to FIGS. 7 and 17.

Figure 13:
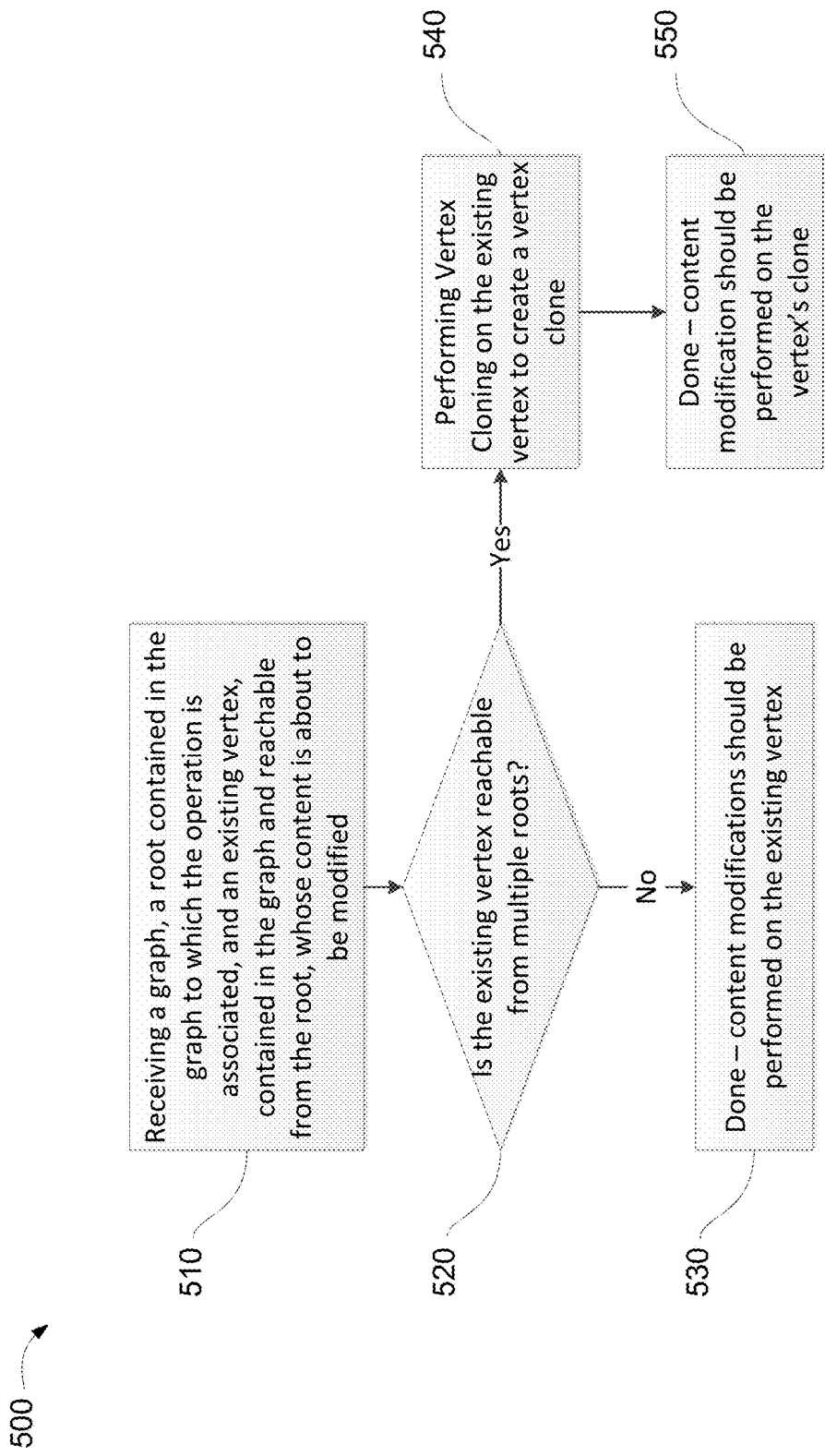
FIG. 13 is a flowchart illustrating one example of a sequence of operations carried out for preparing for modification of vertex content, in accordance with the presently disclosed subject matter.
Figure 21:
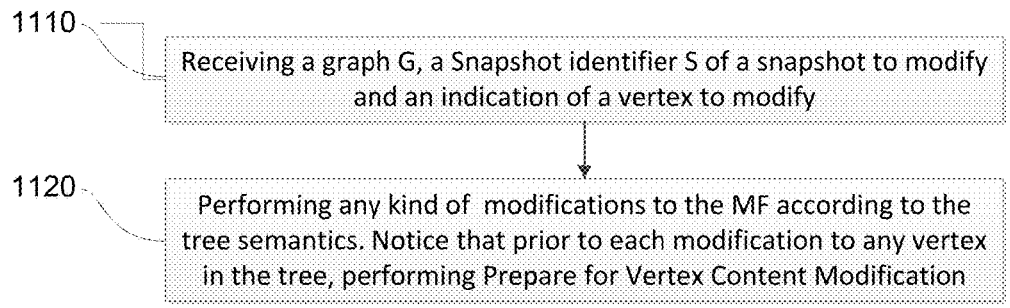
FIG. 21 is a flowchart illustrating one example of a sequence of operations carried out for modifying a snapshot, in accordance with the presently disclosed subject matter.

According to some examples of the presently disclosed subject matter, MF modification module 130 can be configured to perform an MF modification process, as further detailed herein, inter alia with reference to FIGS. 13 and 21.

Figure 9:
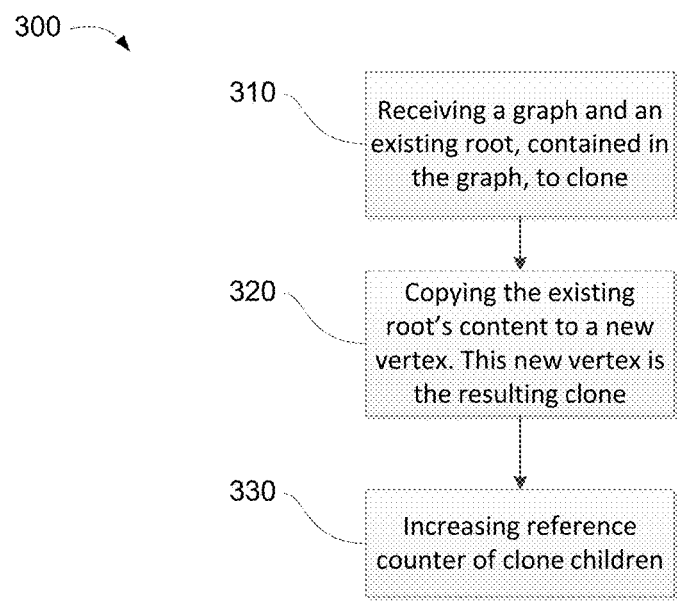
FIG. 9 is a flowchart illustrating one example of a sequence of operations carried out for cloning a MF root vertex in a graph, in accordance with the presently disclosed subject matter.
Figure 19:
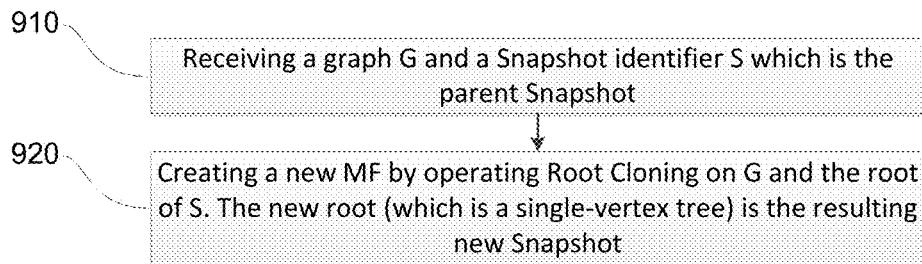
FIG. 19 is a flowchart illustrating one example of a sequence of operations carried out for creating a child snapshot, in accordance with the presently disclosed subject matter.

According to some examples of the presently disclosed subject matter, MF cloning module 140 can be configured to perform an MF (or parts thereof) cloning process, as further detailed herein, inter alia with reference to FIGS. 9, 11 and 19.

Figure 15:
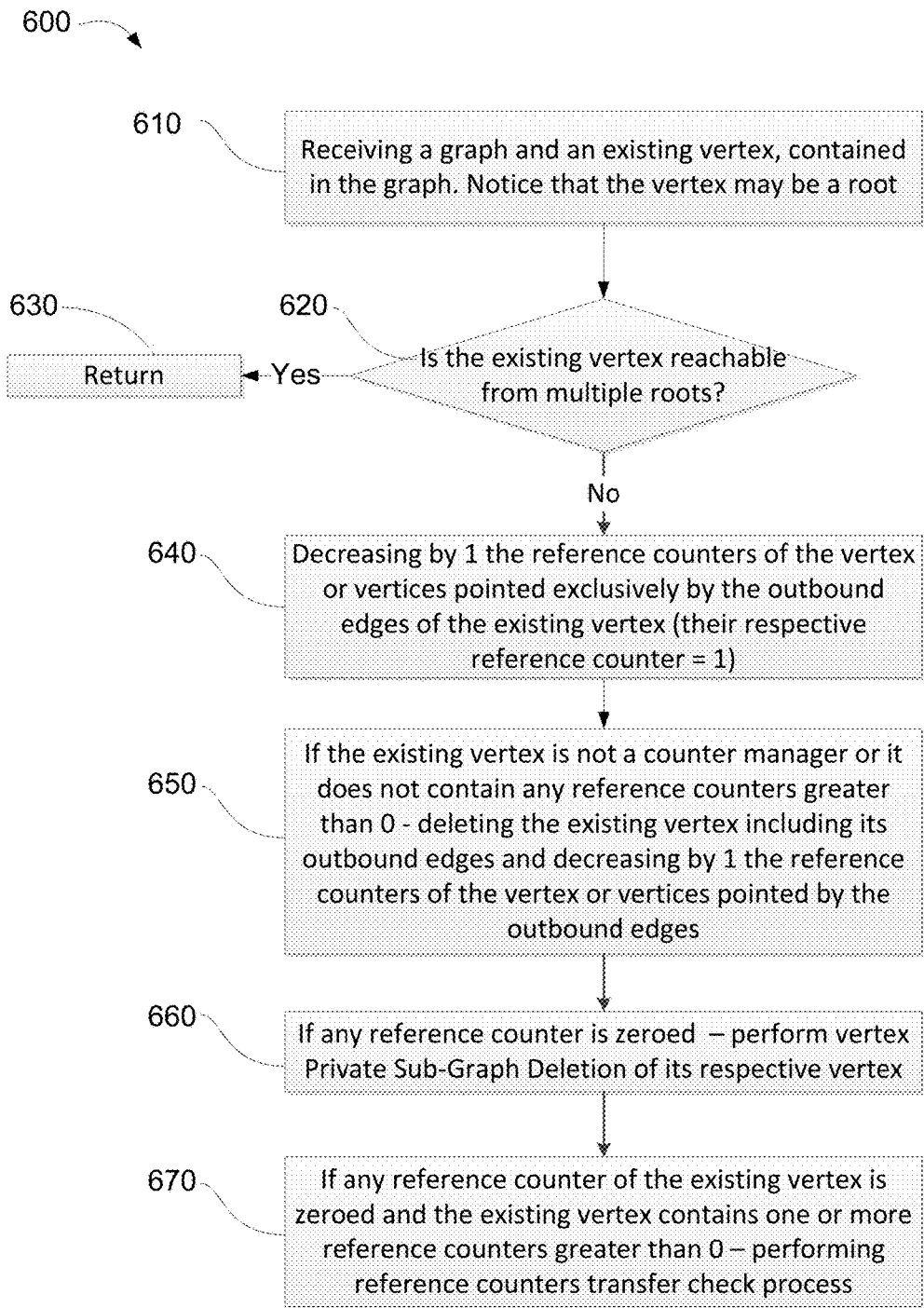
FIG. 15 is a flowchart illustrating one example of a sequence of operations carried out for deleting a vertex private sub-graph, in accordance with the presently disclosed subject matter.
Figure 18:
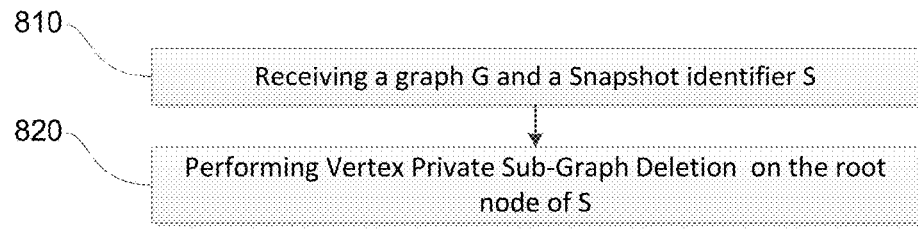
FIG. 18 is a flowchart illustrating one example of a sequence of operations carried out for deleting a snapshot, in accordance with the presently disclosed subject matter.

According to some examples of the presently disclosed subject matter, MF deletion module 150 can be configured to perform an MF (or parts thereof) deletion process, as further detailed herein, inter alia with reference to FIGS. 15 and 18.

Figure 20:
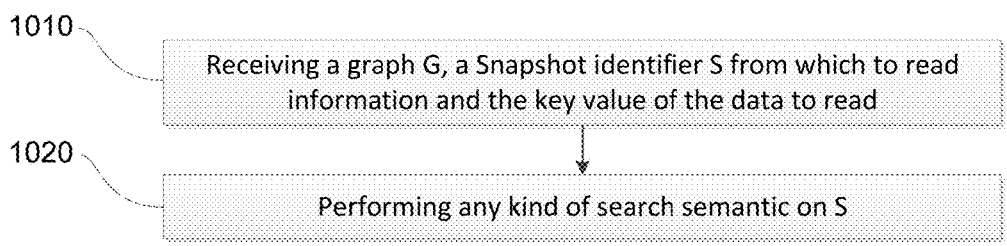
FIG. 20 is a flowchart illustrating one example of a sequence of operations carried out for reading from a snapshot, in accordance with the presently disclosed subject matter.

According to some examples of the presently disclosed subject matter, MF read module 160 can be configured to perform a process of reading a value from an addressable data space mapped by a MF, as further detailed herein, inter alia with reference to FIG. 20.

Attention is now drawn to FIG. 4, a flowchart illustrating one example of a sequence of operations carried out for updating a checkpoint in the CDP data structure, in accordance with the presently disclosed subject matter.

According to some examples of the presently disclosed subject matter, system 10 can be configured to perform a checkpointing process 2000 (e.g. utilizing checkpointing module 145). In some cases, the system 10 can be configured to check if an inter-index checkpoint criterion is met (block 2010). An inter-index checkpoint criterion can be, a pre-defined or calculated size threshold of the second index region 9160 (in some cases, the second index region 9160 can be stored on a primary memory that can have limited space). In such cases, when the size of the second index region 9160 exceeds the pre-defined or calculated size threshold, the checkpoint criterion is met. It is to be noted that in some cases the size threshold can be pre-defined and in other cases the size threshold can be calculated dynamically, e.g. while taking into consideration the available primary memory space constraints (e.g. the more available primary memory space available—the farther the threshold will be set and vice versa).

The inter-index checkpoint criterion can additionally or alternatively be time-dependent. For example, the criterion can define that the second log region 9130 (that stores write operations that are more recent than write operations stored on the first log region 9120) will only contain information of write operations performed after a certain point-in-time. Such point-in-time can be defined by a pre-determined time window (e.g. a given number of seconds/minutes/hours/days/weeks). In some cases the time window can be calculated dynamically, e.g. while taking into consideration the available primary memory space constraints (e.g. the more available primary memory space available—the larger the time-window will be set and vice versa).

The inter-index checkpoint criterion can additionally or alternatively be generation number dependent. For example, the criterion can define that the second log region 9130 will only include write operations whose generation number is above a given minimal generation number or below a given maximal generation number. The given minimal generation number can be calculated, for example, while taking into account the most recent generation number (assuming that the most recent generation number is X, the minimal generation number can be set to X minus a certain number, which will provide the given minimal generation number). A maximal generation number can be determined by an external entity (e.g. an external controller).

In some cases, if the inter-index checkpoint criterion is not met, system 10 can be configured to continue monitoring whether the checkpoint criterion is met (block 2010), e.g. continuously or periodically.

In case the inter-index checkpoint criterion is met, system 10 can be configured to update the checkpoint 9140 to define a third point-in-time that is later than the second point-in-time (block 2020). As the checkpoint 9140 defines the boundary between the first log region 9120 and the second log region 9130, it can be appreciated that such update of the checkpoint 9140 can result in an updated first log region (which, following the update, includes also a portion of the second information that was previously associated with the second log region 9130) and updated second log region (which, following the update, may no longer include the portion of the second information that is now associated with the first log region 9120).

In some cases, system 10 can be further configured to apply (write) all or part of the logged write operations performed after the second point-in-time (the checkpoint prior to its update) and before the third point-in-time (the updated checkpoint) to the third memory 117 (that is an addressable data space) (block 2030). It is to be noted that until this stage, the write operations that are logged on the second log region 9130 are not applied to the addressable data space. It is to be further noted that any other write operation (which is not logged) is not handled by the mechanisms described herein, and can optionally be applied to the addressable data space when it is performed, using known mechanisms.

It is to be noted, as further detailed with respect to FIG. 5, that one of the purposes of applying the logged write operation to the addressable data space is to increase read performance. In some cases, when the system 10 is requested to provide the data of a certain required physical storage object address at a given point-in-time that is after the checkpoint 9140, and assuming that the second log region does not include any routing data that relates to the required physical storage object address and that has been performed before the given point in time, the system can simply fetch the data from the required physical storage object address of the addressable data space (e.g. the third memory), as such data represents the value stored in the required physical storage object address at the required point in time. In such cases, there will be no need in searching for data in the first log region 9120 (using the first index region 9150). It is to be noted that in some cases, the first index region can be stored on a secondary memory, and therefore, searching the first index region can be a time consuming task from which it is preferable to avoid.

In some cases, system 10 can configured to calculate an updated first index region (block 2040) and/or an updated second index region (block 2050) so that the updated first index region will index the updated first log region and that the updated second index region will index the updated second log region. It is to be noted that in some cases the calculation of the updated second index region is performed after calculation of the updated first index region.

In some cases, an updated second index region can be calculated by a process that is not necessarily synchronized with the checkpointing process.

It is to be noted, with reference to FIG. 4, that some of the blocks can be integrated into a consolidated block or can be broken down to a few blocks and/or other blocks may be added. Furthermore, in some cases, the blocks can be performed in a different order than described herein. It should be also noted that whilst the flow diagrams are described also with reference to the system elements that realizes them, this is by no means binding, and the blocks can be performed by elements other than those described herein.

Turning to FIG. 5, there is shown a flowchart illustrating one example of a sequence of operations carried out for reading data having a given physical storage object address, in a given point-in-time, from the CDP data structure, in accordance with the presently disclosed subject matter.

According to some examples of the presently disclosed subject matter, system 10 can be configured to perform a CDP read process 2300 of reading an object from the CDP data structure (e.g. utilizing read module 135).

In some cases, the system 10 can be configured to receive a read request including a required physical storage object address of routing data (or of an actual written data) to be read and a required point in time (block 2310).

It is to be noted that in some cases the routing data (or the actual written data) can have different values at different points in time (e.g. a first value when the base snapshot 9110 was acquired and/or one or more other values logged in the first log region 9120 and/or one or more values logged in the second log region 9130) and therefore the required point in time is used for identifying the relevant routing data (or the relevant actual written data) out of the plurality of routing data (or actual written data) objects having the same required physical storage object address.

For illustration purposes, let's assume that a given routing data (or a given actual written data) having a given physical storage object address had a first value "A" on date/time "T1" when the base snapshot 9110 was acquired, a second value "B" on date/time "T2" that is before the second point in time 9140, and a third value "C" on date/time "T3" that is after the second point in time 9140. When reading from the CDP data structure, the required point in time is used for identifying the relevant value out of the plurality of the values that can be retrieved from the CDP data structure for the same given object. Assuming that the required point in time is after T1 (the snapshot acquisition time) but before T2, the relevant value of the routing data (or of the actual written data) at that time is "A". Assuming that the required point in time is after T2 but before T3, the relevant value of the routing data (or of actual written data) at that time is "B". Assuming that the required point in time is after T3, the relevant value of the routing data (or of the actual written data) at that time is "C".

In some cases, system 10 can be configured to check if the required point in time is later than, or equal to, the second point in time 9140 (block 2315).

In case the required point in time is earlier than the second point in time 9140, the system 10 can be configured to determine, utilizing the first index region 9150, if the first log region 9120 includes one or more matching routing data (or actual written data) objects having a physical storage object address equal to the required physical storage object address and write time data earlier than the required point in time (block 2335). If so—the system 10 can be configured to retrieve the matching routing data (or actual written data) having the write-time data indicative of the most recent time earlier than, or equal to, the required point in time, from the first log region 9120 (block 2340). If not—the system 10 can be configured to retrieve the routing data (or actual written data) from the third memory 117, by accessing the third memory at the physical storage object address equal to the required physical storage object address (block 2345). It is to be noted that the read-only base snapshot 9110 acquired at the first point in time guarantees that no data is written, after the first point in time, to the addressable data space mapped by the read only base snapshot or used by the read-only base snapshot (e.g. metadata). Therefore, if the first log region 9120 does not include any matching routing data (or actual written data) objects having a physical storage object address equal to the required physical storage object address and write time data earlier than, or equal to, the required point in time—the data stored on the third memory, at the required physical storage object address, is the required routing data (or the required actual written data).

In case the required point in time is later than, or equal to, the second point in time 9140, the system 10 can be configured to determine, utilizing the second index region 9160, if the second log region 9130 includes one or more matching routing data (or matching actual written data) objects having a physical storage object address equal to the required physical storage object address and write time data earlier than, or equal to, the required point in time (block 2320). If so—the system 10 can be configured to retrieve the matching routing data (or the matching actual written data) having the write-time data indicative of the most recent time earlier than, or equal to, the required point in time, from the second log region 9130 (block 2325). If not—the system 10 can be configured to retrieve the routing data (or the actual written data) from the third memory 117, by accessing the third memory at the physical storage object address equal to the required physical storage object address (block 2330). It is to be noted that any write operation performed before the second point in time is applied to the third memory during the checkpointing process 2000, and therefore, if the log does not include any matching routing data (or matching actual written data) objects having a physical storage object address equal to the required physical storage object address and write time data earlier than, or equal to, the required point in time—the data stored on the third memory, at the required physical storage object address, is the required routing data (or the required actual written data). It is to be noted that any write operation performed after the base snapshot is acquired will not be directed at a physical storage object address that is mapped by the base snapshot or used by the snapshot itself (e.g. metadata), as the base snapshot is read-only. Therefore data integrity is maintained.

Figure 24:
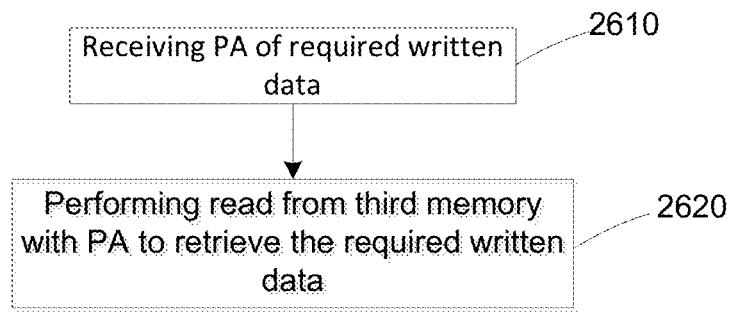
FIG. 24 is a flowchart illustrating one example of a sequence of operations carried out for reading the written data in a scenario where the written data is not logged in the log, in accordance with the presently disclosed subject matter.

It is to be noted that the retrieved routing data (or actual written data) can be used in order to retrieve the required written data, as further detailed herein, inter alia with reference to FIG. 24.

It is to be noted, with reference to FIG. 5, that some of the blocks can be integrated into a consolidated block or can be broken down to a few blocks and/or other blocks may be added. Furthermore, in some cases, the blocks can be performed in a different order than described herein. It should be also noted that whilst the flow diagrams are described also with reference to the system elements that realizes them, this is by no means binding, and the blocks can be performed by elements other than those described herein.

Figure 6A:
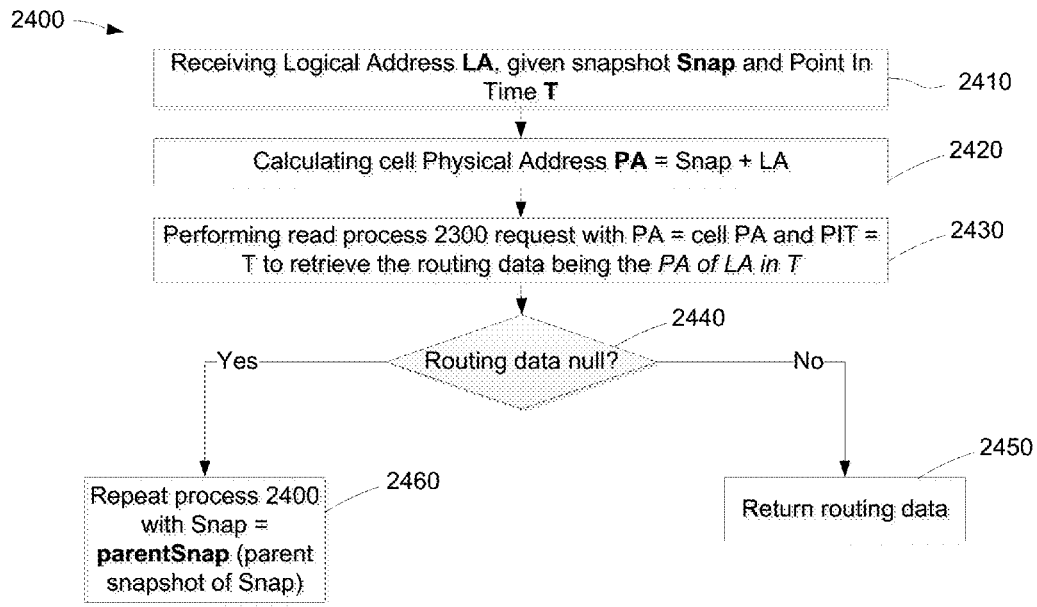
FIG. 6a is a flowchart illustrating one example of a sequence of operations carried out for reading routing data from the CDP data structure, in accordance with the presently disclosed subject matter.

FIG. 6a is a flowchart illustrating one example of a sequence of operations carried out for reading routing data from the CDP data structure, in accordance with the presently disclosed subject matter.

Before turning to the array routing data read process 2400, it has been indicated above that the base snapshot 9110 provides a read-only mapping between the logical storage object addresses and the corresponding physical storage object addresses at the first point in time 9110. Any write operation performed after the first point in time is associated with another snapshot, acquired after the first point in time, that provides a mapping between the logical storage object addresses associated with the write operation and the corresponding physical storage object addresses thereof. It is to be noted that multiple snapshots can be acquired after the first point in time. When a snapshot is acquired, the active writeable snapshot becomes a read only snapshot and a new active writeable snapshot is created. It is to be further noted that the snapshots described herein can be implemented by various data structures.

In the example illustrated in FIG. 6a, the snapshots are represented by an array data structure (also referred to herein as "snapshot array"). In such implementations, the logical storage object address is used for identifying a certain cell within the array data structure, and the cells themselves contain corresponding physical storage object addresses that point at the physical location of the data written to these logical storage object addresses. As an example, when a write operation to a given logical block address of a given snapshot array is performed, the cell, that is located at a physical offset from the start address of the given snapshot (the offset defined by the given logical block address in the snapshot array), is updated to indicate the physical storage object address in which the written data, written to the given logical block address of the given snapshot array, is stored (e.g. on the third memory).

It is to be noted that in some cases, multiple writes to a given logical storage object address can be performed over a certain time window, and information of such write operations can also be logged in the log. The write operations to a certain logical storage object address made on different points in time can each be mapped to different physical storage object addresses (stored on the corresponding cell of the snapshot array at the respective point in time).

As indicated herein, multiple snapshots can be acquired after the first point in time. When a snapshot is acquired, the active writeable snapshot array becomes a read only snapshot and a new active writeable snapshot array is created. The snapshot that became read only is also referred to as a parent snapshot of the new active writeable snapshot. Each snapshot array can include information of write operations that have been performed while it was the active writeable snapshot. Information about write operations that took place beforehand can be stored on one of its parent snapshot arrays (the snapshot arrays that preceded it) in accordance with the time such operations have been performed (as they are stored on the snapshot that was the active writeable snapshot at the time they were performed).

Turning to the array routing data read process 2400, according to some examples of the presently disclosed subject matter, system 10 can be configured to perform an array routing data read process 2400 of reading data that is associated with a given logical storage object address at a certain point in time (e.g. utilizing read module 135).

In some cases, the system 10 can be configured to receive the given logical storage object address (which, in the snapshot array exemplary implementation, defines an offset from the physical given snapshot array start address, as explained hereinafter), an indication of a given snapshot (e.g. a snapshot identifier that enables determination of the relevant snapshot which maps the given logical storage object address to its corresponding physical storage object addresses) and a required point in time (block 2410).

Using the given snapshot identifier (that enables obtaining the given snapshot's array physical start address) and the given logical storage object address, system 10 can calculate the physical storage object address of the corresponding cell of the snapshot array (being the physical storage object of the cell that is located in an offset from the given snapshot array physical start address, the offset defined by given logical storage object address) (block 2420).

In order to read the data that was stored in the calculated physical storage object address (calculated using the given logical storage object address as indicated herein) at the required point in time (as indicated above, multiple write operations to the calculated physical storage object address can be performed at various points in time, and therefore the data stored within the calculated physical storage object address can be different depending on the point in time), the system 10 can be configured to perform the CDP read process 2300 with the calculated physical storage object address and the required point in time (block 2430), in order to retrieve routing data. The routing data is the physical storage object address of the data that was stored on the given snapshot, at the given logical storage object address, at the required point in time.

If routing data is found (e.g. it is not null), system 10 can be configured to return the routing data (block 2450). However, if no routing data found (which means that no write to the given logical storage object address has been made while the given snapshot was the active snapshot), system 10 can be configured to repeat the array routing data read process 2400 with the parent snapshot of the given snapshot instead of the given snapshot (block 2460). The first instance of routing data that will be found in this iterative process will be the physical storage object address of the data that was located in the given logical storage object address at the required point in time.

It is to be noted that, with reference to FIG. 6, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 6B:
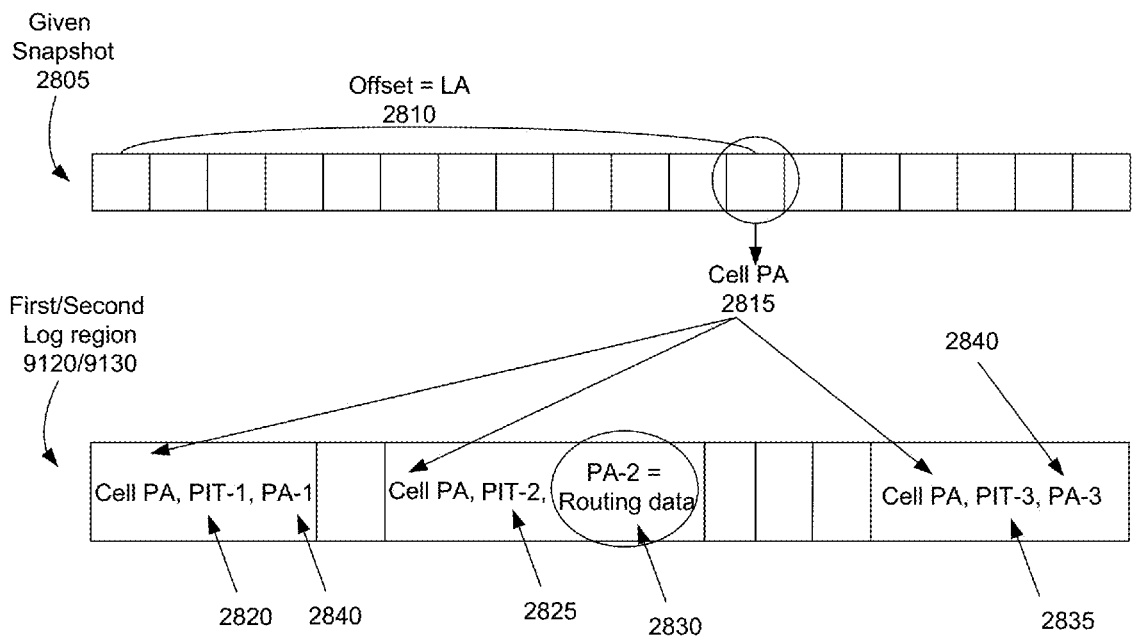
FIG. 6b is an exemplary schematic illustration of a sequence of operations carried out for reading routing data from the CDP data structure, in accordance with the presently disclosed subject matter.

In order to have a visual illustration of the array routing data read process 2400, attention is drawn to FIG. 6*b*, showing an exemplary schematic illustration of a sequence of operations carried out for reading routing data from the CDP data structure, in accordance with the presently disclosed subject matter.

As indicated with respect to FIG. 6*a*, the system 10 receives an indication of a given snapshot shown as given snapshot 2805, a given logical storage object address shown as Logical Address (LA) 2810, and a required point in time (not shown). The given snapshot 2805 has a physical start address, and using the given logical storage object address, the physical storage object address of the cell, shown as Cell PA 2815, can be calculated (e.g. the physical start address of the given snapshot 2805 plus the offset defined by the given logical storage object address LA 2810).

In the illustrated example, information was written to the cell located in Cell PA 2815 of the given snapshot 2805 on three different times, and each of the different write operations are stored in the log. For the purpose of the illustrated example it is assumed that all of the write operations occurred wither before the checkpoint 9140 or after the checkpoint 9140, so that they are all logged either in the first log region 9120 or in the second log region 9130.

In the first point in time, shown as PIT-1 2820, the cell located in Cell PA 2815 contained the value PA-1 2840. In a later point in time, shown as PIT-2 2825, the cell located in Cell PA 2815 contained the value PA-2 2830. In the latest point in time, shown as PIT-3 2835, the cell located in Cell PA 2815 contained the value PA-3 2840.

Assuming that the required point in time is later than, or equal to, PIT-2 2825 and earlier than PIT-3 2835, the relevant routing data is PA-2 2830, which is the physical storage object address of the data that was stored on the given snapshot 2805, at the given logical storage object address LA 2810, at the required point in time.

Having described one exemplary data structure (array) that can be used for implementing the snapshots in accordance with the presently disclosed subject matter, a more detailed explanation about the MF data structure is provided herein. The MF data structure can also be used for implementing the snapshots in accordance with the presently disclosed subject matter.

FIG. 7 is a flowchart illustrating one example of a sequence of operations carried out for creating a new Mapping Function (MF) root vertex in a graph, in accordance with the presently disclosed subject matter;

According to some examples of the presently disclosed subject matter, system 10 (e.g. utilizing MF creation module 120) can be configured to perform a create new root process 200. System 10 can be configured to receive an indication of a graph into which a new MF root vertex should be added (block 210). In some cases, system 10 can be further configured to add a new MF root vertex to the indicated graph (block 220). In some cases, the new MF root vertex can have no inbound or outbound edges, and in more specific cases it can be empty.

In some cases, system 10 can be also configured to assign vertex data to the vertex (block 230). Such vertex data can be, for example, cache information, various flags, identifiers pertaining to external address spaces, version numbers, synchronization objects, execution queues, or any other type of data, including various types of metadata.

It is to be noted that, with reference to FIG. 7, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 8:
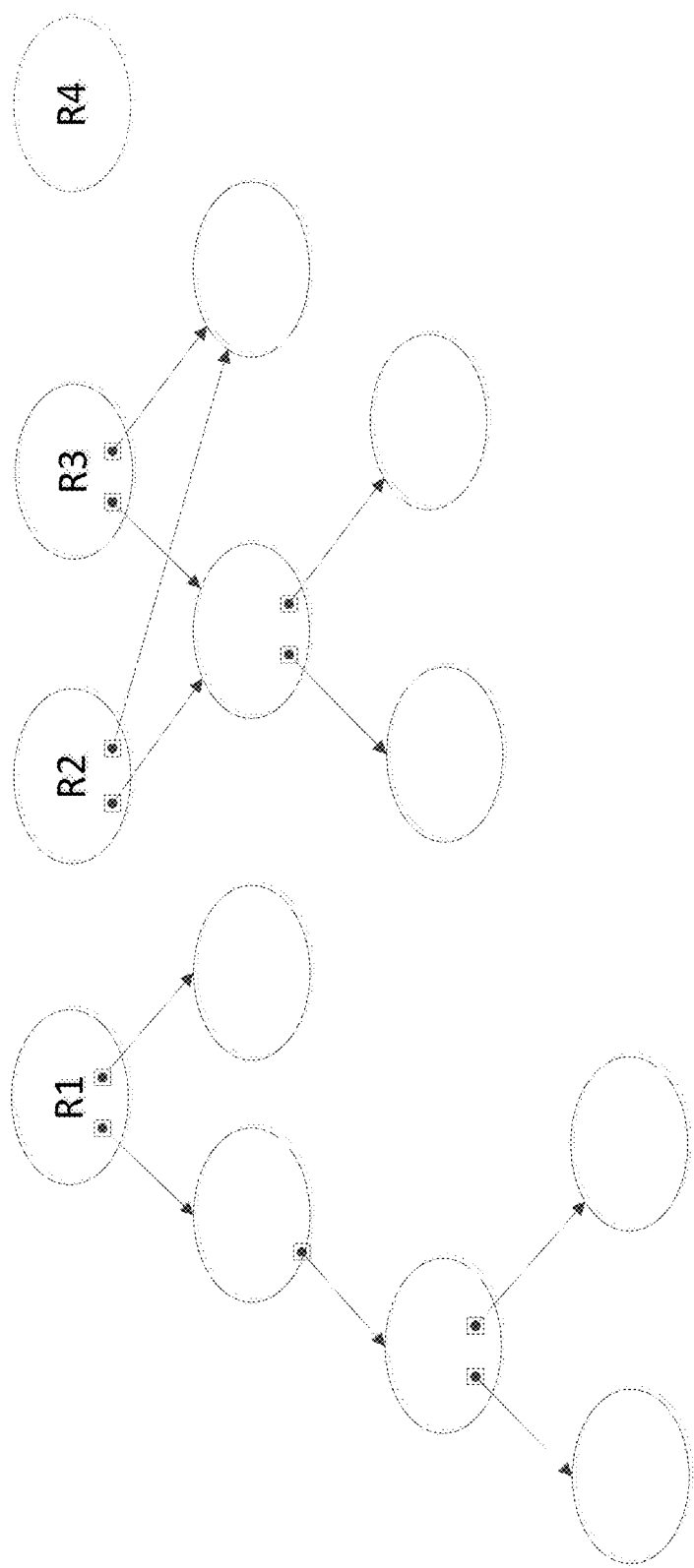
FIG. 8 is an exemplary illustration of a graph into which a new MF root vertex is introduced, in accordance with the presently disclosed subject matter.

Looking at FIG. 8, there is shown an exemplary illustration of a graph into which a new MF root vertex is introduced, in accordance with the presently disclosed subject matter.

In the graph shown in the illustration, three MF root vertices exist: R1, R2 and R3, all of which have children vertices in the illustrated example. MF root vertex R4 (shown with a dashed line) is a new vertex introduced into the graph. It can be appreciated that R4, the newly introduced MF root vertex, is an empty vertex that has no inbound or outbound edges, however in some cases, R4 can contain various vertex data.

Attention is now drawn to FIG. 9, a flowchart illustrating one example of a sequence of operations carried out for cloning a MF root vertex in a graph, in accordance with the presently disclosed subject matter.

According to some examples of the presently disclosed subject matter, system 10 (e.g. utilizing MF cloning module 140) can be configured to perform a root cloning process 300. System 10 can be configured to receive an indication of a graph into which a clone of a MF root vertex should be added and an indication of the MF root vertex (contained in the graph) to be cloned (block 310). In some cases, system 10 can be further configured to add a new MF root vertex to the indicated graph and to create a copy of at least one of the cloned MF's root vertex keys and/or the cloned MF's root edges to the new MF root vertex (block 320). Alternatively or additionally, system 10 can be configured to create a copy of at least one reference to a counter manager vertex pointing at a respective child vertex of said parent MF root vertex, to the new MF root vertex. It is to be noted that in any case where the cloned MF root vertex is the counter manager vertex of a copied edge, the respective new MF root vertex reference should be updated in a manner that reflects the specific reference counter arrangement, as described herein above. In some cases, system 10 can be still further configured to copy also additional vertex data from the cloned MF's root vertex to the new MF root vertex and perform additional copy related actions. Such additional vertex data can be, for example, cache information, various flags, identifiers pertaining to external address spaces, version numbers, synchronization objects, execution queues, or any other type of data, including various types of metadata. In some cases (for example when the MFs represent snapshots of the addressable data space), following creation of the new MF root vertex, the cloned MF root vertex becomes (e.g. by marking it for example with a flag) a read only MF thus preventing any change to the tree spanned by it. In some cases all of the vertices within the tree spanned by the cloned MF's root vertex also become read only.

In some cases, system 10 can be configured to increase each of the reference counters associated with the child vertices of the cloned vertex by 1 (in the respective counter managers), to indicate that an additional vertex is pointing thereto (block 330). It is to be noted, as indicated above, that the reference counter can be stored in a counter manager vertex and/or in any other location.

It is to be noted that, with reference to FIG. 9, some of the blocks can be integrated into a consolidated block or can be broken down to a few blocks and/or other blocks may be added. Furthermore, in some cases, the blocks can be performed in a different order than described herein (for example, block 330 can be performed before block 320). It should be also noted that whilst the flow diagram is described also with reference to the system elements that realizes them, this is by no means binding, and the blocks can be performed by elements other than those described herein.

Figure 10:
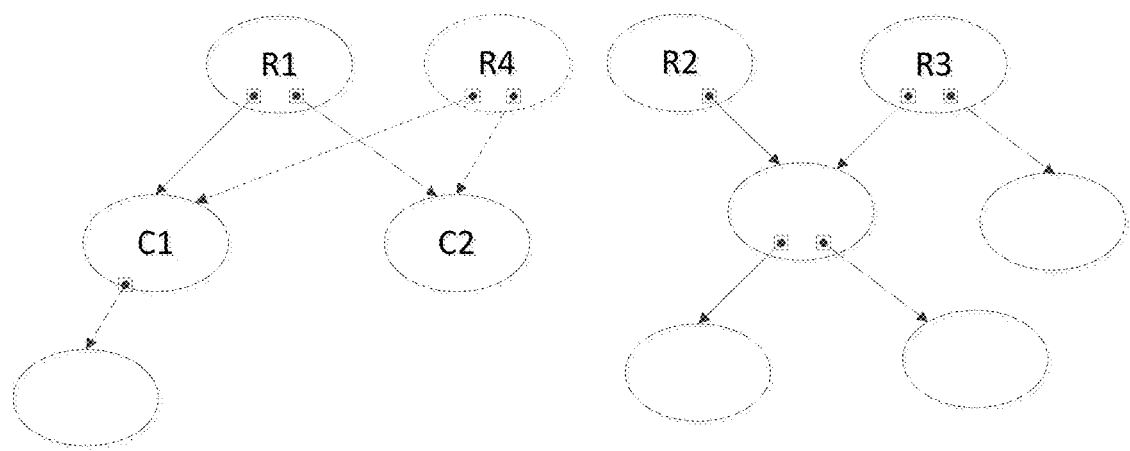
FIG. 10 is an exemplary illustration of a graph into which a new MF root vertex is introduced as a clone of an existing MF root vertex, in accordance with the presently disclosed subject matter.

Looking at FIG. 10, there is shown an exemplary illustration of a graph into which a new MF root vertex is introduced as a clone of an existing MF root vertex, in accordance with the presently disclosed subject matter.

In the graph shown in the illustration, three MF root vertices exist: R1, R2 and R3, all of which have children vertices in the illustrated example. MF root vertex R4 (shown with a dashed line) is a new MF root vertex introduced into the graph as a clone of MF root vertex R1. It can be appreciated that R4, the newly introduced MF root vertex, has a copy of the outbound edges of MF root vertex R1 pointing at the child vertices C1 and C2. The keys of R1 and R4 are not shown in the illustration, however, when cloning a MF root vertex (R1 in the illustration), the keys of the cloned MF root vertex are also copied into its clone (R4 in the illustration).

In some cases, reference counters associated with the child vertices of the cloned vertex (in this example: C1 and C2) can be increased by 1 to indicate that an additional vertex is pointing thereto. In some cases, the reference counters can be stored in one or more counter managers. In the illustrated example, the counter manager can be vertex R1, that is the original parent of the vertices C1 and C2 (however, it is to be noted that a counter manager can also be another vertex, for example a vertex to which one or more of the reference counters have been handed over to). It is to be noted, as indicated herein, that in some cases the reference counters can be stored in another location.

As indicated herein, in some cases, additional vertex data can be copied from the cloned MF's root vertex to its clone and additional copy related actions can be performed. In some cases, R1 can be marked (e.g. by setting a flag) as a read only MF, thus preventing any change to the tree spanned by it. In some cases all of the vertices within the tree spanned by the cloned MF's root vertex are also marked as read only.

Attention is now drawn to FIG. 11, a flowchart illustrating one example of a sequence of operations carried out for cloning a non-root vertex in a graph, in accordance with the presently disclosed subject matter.

According to some examples of the presently disclosed subject matter, system 10 (e.g. utilizing MF cloning module 140) can be configured to perform a vertex cloning process 400. System 10 can be configured to receive an indication of a graph, an indication of a non-root vertex (contained in the graph) to be cloned and an indication of a MF root vertex, that is not marked as read-only, through which the vertex to be cloned is accessible and with which the clone should be associated (block 410). In some cases, system 10 can be further configured to create a new vertex and copy all or part of the content (including, at least the keys and edges) of the non-root vertex to be cloned to the new vertex (block 420).

Let P be the set of vertices that are directly connected to the vertex to be cloned through inbound edges thereof (any vertex that has an outbound edge pointing at the vertex to be cloned) and that are accessible from the indicated MF root vertex, for each vertex V in P that is accessible from more than one MF root vertex (including the indicated MF root vertex). System 10 can be further configured to perform the vertex cloning process 400, this time with V as the non-root vertex, in order to create V' as a clone of V (block 430).

System 10 can be still further configured, for each new vertex, to check if the vertex from which it was cloned has an inbound edge pointing thereto. If so, system 10 can be configured to check if the vertex or vertices from which the inbound edge originates (the vertex or vertices that have an outbound edge pointing at the vertex from which the new vertex was cloned, hereinafter: "Parent Vertices") were also cloned or that the inbound edge originates from the indicated MF root vertex. If the vertex or vertices from which the inbound edge originates were also cloned, system 10 can be configured to update the outbound edge of the clone(s) of the Parent Vertices to point at the new vertex or vertices. In such cases, system 10 can optionally be also configured to update the reference counter associated with the clones with the value 1 to indicate that only one vertex is pointing thereto (block 440). Looking for example at FIG. 7b, it can be appreciated that the reference counters associated with V2' and V1' should optionally be set to 1 as they are pointed at by one edge only.

In some cases, system 10 can be further configured to increase the reference counter associated with the vertex or vertices that are pointed at by clones created in the vertex cloning process 400 and that such vertex or vertices themselves were not cloned (block 450). Looking for example at FIGS. 7a and 7b it can be appreciated that the reference counter associated with vertex V3 should be increased since prior to the cloning only one vertex pointed thereto (V2 in FIG. 7a), whereas after the cloning two vertices point thereto (V2 and V2' in FIG. 7b).

In some cases, system 10 can be still further configured to decrease by 1 the reference counter associated with a vertex or vertices that were cloned and whose clone is pointed at by an edge that previously pointed at them (before they were cloned) (block 460). Looking for example at FIGS. 7a and 7b it can be appreciated that the reference counter associated with vertex V2 should be decreased since prior to the cloning two vertices pointed thereto (R2 and R3 in FIG. 7a), whereas after the cloning only one vertex points thereto (R3 in FIG. 7b) whereas the other vertex that pointed thereto prior to the cloning now points at its clone (after cloning, R2 points at V2' in FIG. 7b).

In some cases, system 10 can be configured to check if the indicated MF root vertex has a reference to a vertex that was cloned, and if so—update the indicated MF root vertex to point at the clone of the cloned vertex (block 470).

It is to be noted that, with reference to FIG. 11, some of the blocks can be integrated into a consolidated block or can be broken down to a few blocks and/or other blocks may be added. Furthermore, in some cases, the blocks can be performed in a different order than described herein (for example, block 450 can be performed before block 440; block 460 can be performed before block 450; block 470 can be performed before block 460; etc.). It should be also noted that whilst the flow diagram is described also with reference to the system elements that realizes them, this is by no means binding, and the blocks can be performed by elements other than those described herein.

Looking at FIG. 12a and FIG. 12b, in FIG. 12a there is shown an exemplary illustration of a graph containing a vertex to be cloned before its cloning, in accordance with the presently disclosed subject matter, and in FIG. 12b there is shown an exemplary illustration of a graph following cloning of the vertex, in accordance with the presently disclosed subject matter.

In the graph shown in FIG. 12*a*, vertex V1 is a vertex to be cloned before its cloning. It can be appreciated that V1 is accessible through both MF root vertices R2 and R3. It is to be noted that in the illustrated example, the clone of V1 should be associated with R2, which, in the illustrated example is not marked as read-only MF root vertex. The reference counter associated with V2 equals two (as it is pointed at by R2 and R3) and the reference counter associated with V3 equals one (as it is only pointed at by V2).

Turning to FIG. 12*b*, following the vertex cloning process 400, V1 is cloned to V1' and V2 is cloned to V2'. In addition, the outbound edge of V2' that pointed at V1 was updated to point at V1' and the outbound edge of R2 that pointed at V2 was updated to point at V2'. The reference counter associated with V2 equals one (as it is now only pointed at by R3) and the reference counter associated with V3 equals two (as it is pointed at by V2 and V2').

Attention is now drawn to FIG. 13, a flowchart illustrating one example of a sequence of operations carried out for preparing for modification of vertex content, in accordance with the presently disclosed subject matter.

Before turning to the flowchart, it is to be noted that in some cases, when a certain vertex is accessible through a plurality of MF root vertices, such a vertex is a read-only vertex. When an attempt to modify the vertex is made with respect to a certain MF root vertex out of the plurality of MF root vertices (assuming that it is not marked as a read-only MF root vertex), such a vertex needs to be cloned and its clone needs to be associated with such MF root vertex.

Attention is now drawn back to the flowchart. According to some examples of the presently disclosed subject matter, system (e.g. utilizing MF modification module 130) can be configured to perform a prepare for vertex content modification process 500. System 10 can be configured to receive an indication of a graph, an indication of a non-root vertex (contained in the graph) whose content is to be modified and an indication of a MF root vertex (that is not read-only) through which the vertex whose content is to be modified is accessible and with which the vertex content modification is associated (block 510).

In some cases, system 10 can be further configured to check if the indicated vertex whose content is to be modified is accessible from more than one MF root vertex (including the indicated MF root vertex) (block 520). If not—the preparation is done and the content modification should be performed on the indicated vertex (block 530). If however the answer is yes, the indicated vertex is to be cloned using the vertex cloning process 400 described herein with reference to FIG. 6 (block 540), and the content modification should be performed on the clone of the indicated vertex (block 550).

It is to be noted that, with reference to FIG. 13, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 14:
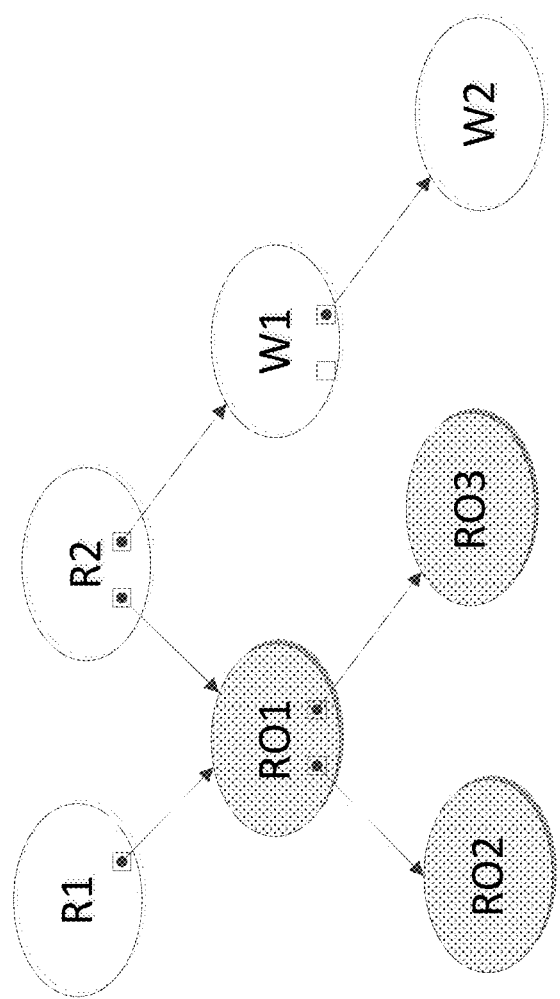
FIG. 14 is an exemplary illustration of a graph including vertices accessible through more than one MF root vertex as well as vertices accessible through a single MF root vertex, in accordance with the presently disclosed subject matter.

Looking at FIG. 14, there is shown an exemplary illustration of a graph including vertices accessible through more than one MF root vertex as well as vertices accessible through a single MF root vertex, in accordance with the presently disclosed subject matter.

In the graph shown in the illustration, two MF root vertices exist: R1 and R2. In addition, 5 additional vertices exist: RO1, RO2, RO3, W1 and W2. The vertices RO1, RO2 and RO3 are accessible through both R1 and R2, whereas the vertices W1 and W2 are accessible only through R2. As indicated herein, in some cases, when a certain vertex is accessible through a plurality of MF root vertices, such a vertex is a read-only vertex. In such cases, in the illustrated example, vertices RO1, RO2 and RO3 will be read only vertices that cannot be modified. In such cases, an attempt to modify such vertices (RO1, RO2 or RO3) through a MF root vertex that is not read-only will result in activating the vertex cloning process 400 described herein with reference to FIG. 6 on the vertex whose modification is required. If, however, the vertex whose modification is required is accessible through a single MF root vertex (W1 and W2 in the illustrated example) modification thereof does not require cloning.

Attention is now drawn to FIG. 15, a flowchart illustrating one example of a sequence of operations carried out for deleting a vertex private sub-graph, in accordance with the presently disclosed subject matter.

According to some examples of the presently disclosed subject matter, system 10 (e.g. utilizing MF deletion module 150) can be configured to perform a vertex private sub-graph deletion process 600. System 10 can be configured to receive an indication of a graph and an existing vertex contained in the graph, whose deletion is requested along with deletion of any vertices on the private sub-graph to which the existing vertex belongs (i.e. vertices accessible only through a single root) (block 610).

In some cases, system 10 can be configured to check if the existing vertex is not within a private sub-graph (i.e. reachable from multiple roots) (block 620) and if so—the process returns (it is to be noted that the private sub-graph deletion process 600 is recursive) (block 630).

In case the existing vertex is reachable only through a single root, system 10 can be configured to decrease by 1 the reference counters associated with any vertices pointed at exclusively by outbound edges of the existing vertex (vertices whose respective reference counters equal 1) (block 640).

In some cases, if the existing vertex is not a counter manager vertex or the existing vertex does not contain any shared reference counters (reference counters that are used by at least one vertex other than the vertices pointed by it), the system 10 can be configured to delete the existing vertex including its outbound edges, and to decrease by 1 the reference counters of the vertex or vertices pointed at by its outbound edges (block 650).

In some cases, system 10 can be further configured to perform the vertex private sub-graph deletion process 600 for each vertex whose respective reference counter was zeroed (block 660).

Figure 22:
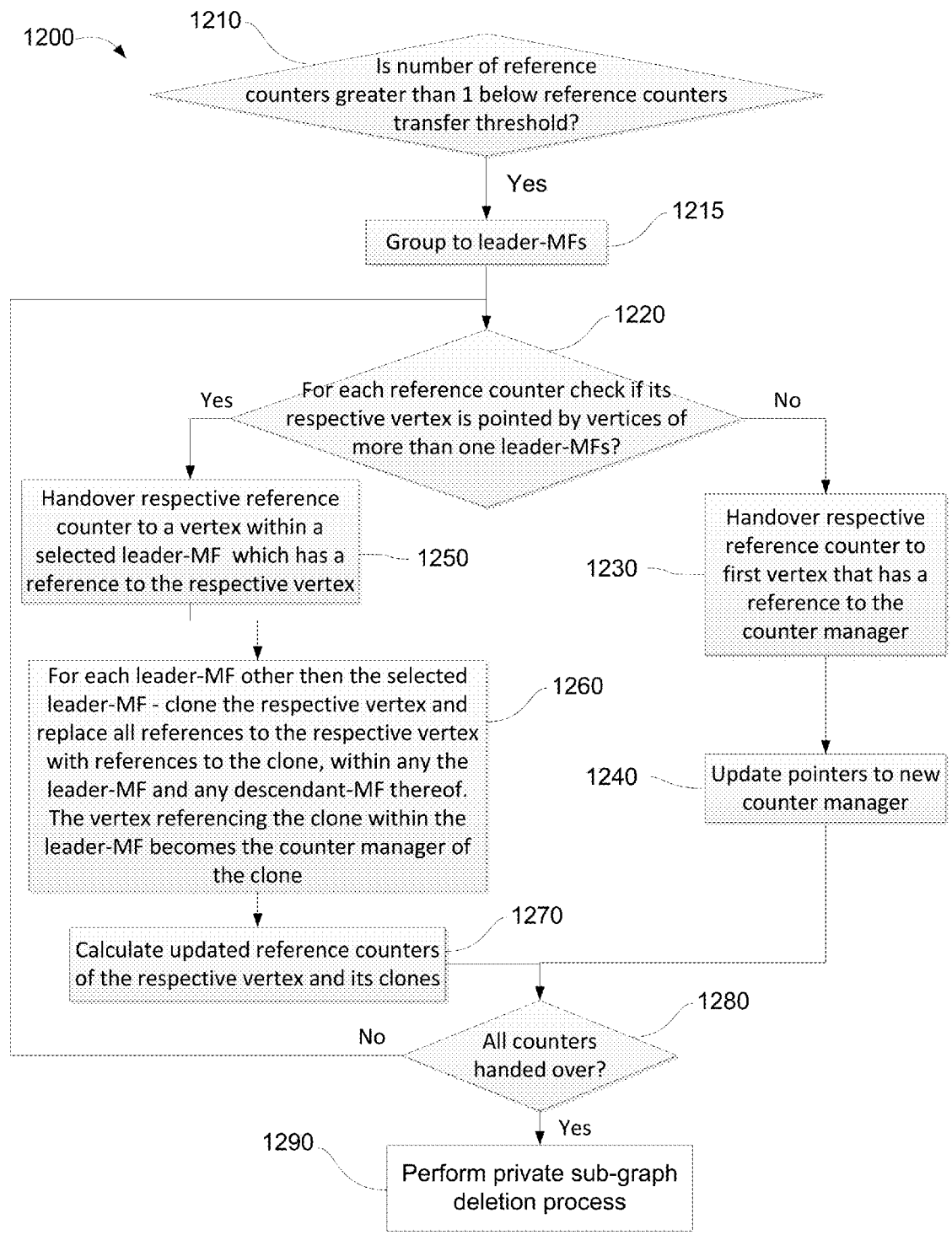
FIG. 22 is a flowchart illustrating one example of a sequence of operations carried out for releasing counter nodes, in accordance with the presently disclosed subject matter.

In some cases, if one or more reference counters have been zeroed and the existing vertex contains one or more reference counters greater than zero, system 10 can be configured to trigger a reference counters transfer check process (block 670), as further detailed herein with reference to FIG. 22.

It is to be noted that, with reference to FIG. 15, some of the blocks can be integrated into a consolidated block or can be broken down to a few blocks and/or other blocks may be added. Furthermore, in some cases, the blocks can be performed in a different order than described herein (for example, block 670 can be performed before block 660, etc.). It should be also noted that whilst the flow diagram is described also with reference to the system elements that realizes them, this is by no means binding, and the blocks can be performed by elements other than those described herein.

Figure 16A:
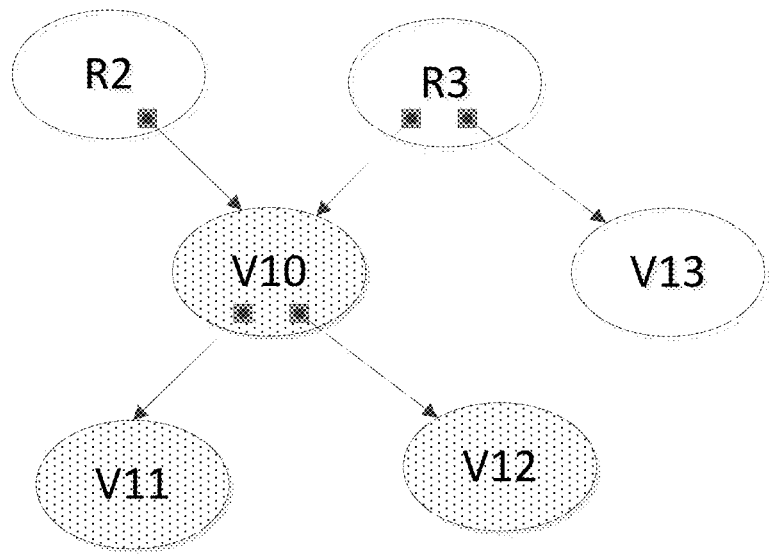
FIG. 16a is an exemplary illustration of a graph containing a MF root vertex to be deleted before its deletion, in accordance with the presently disclosed subject matter.
Figure 16B:
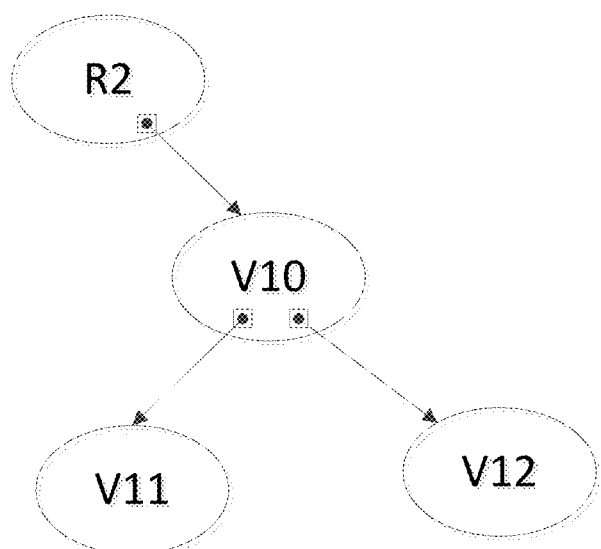
FIG. 16b is an exemplary illustration of a graph following deletion of the MF root vertex, in accordance with the presently disclosed subject matter.

Looking at FIG. 16a and FIG. 16b, in FIG. 16a there is shown an exemplary illustration of a graph containing a MF root vertex to be deleted before its deletion, in accordance with the presently disclosed subject matter, and in FIG. 16b there is shown an exemplary illustration of a graph following deletion of the MF root vertex, in accordance with the presently disclosed subject matter.

In the graph shown in FIG. 16a, there are two MF root vertices, R2 and R3. In addition, there are three shared vertices, V10, V11 and V12 that are accessible through more than one MF root vertex (R2 and R3), and one vertex, V13, that is accessible only through R3. In the illustration, MF root vertex R3 is a MF root vertex to be deleted before its deletion. It is to be further noted that the reference counter associated with vertex V10 equals 2, as it is pointed at by both R2 and R3.

Turning to FIG. 16b, following the vertex private sub-graph deletion process 600, R3 and V13 are deleted, however V10, V11 and V12 are not deleted since they were shared vertices accessible through R2 in addition to the deleted R3. It is to be noted that V10, V11 and V12 are no longer shared vertices since following the deletion of R3 they are accessible through a single MF root vertex, R2. It is to be further noted that following the deletion, the reference counter associated with vertex V10 equals 1, as following the deletion it is only pointed at by R2.

Following description of the general data structure of the MFs, attention is now drawn to a specific, however non-limiting, example of an implementation of data storage snapshot management using the data structure. It is to be noted that the data structure can be used in other fields, such as, for example, database, object space, computerized memories (including Read Only Memory—ROM, Random Access Memory—RAM, or any other type of memory), networked resources addresses, Uniform Resource Locators—URLs, or any other addressable data space. Each MF in the following example represents a data storage snapshot acquired at a certain point in time.

FIG. 17 is a flowchart illustrating one example of a sequence of operations carried out for creating a new data storage snapshot, in accordance with the presently disclosed subject matter.

System 10 (e.g. utilizing MF creation module 120) can be configured to receive an indication of a graph into which the new snapshot is to be inserted (block 710) and to create a new MF within the indicated graph by performing the create new root process 200. The new MF root vertex that is created as a result of the create new root process 200 is the resulting new snapshot.

It is to be noted that, with reference to FIG. 17, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 18, a flowchart illustrating one example of a sequence of operations carried out for deleting a snapshot, in accordance with the presently disclosed subject matter.

According to some examples of the presently disclosed subject matter, system 10 (e.g. utilizing MF deletion module 150) can be configured to receive an indication of a graph containing the snapshot to be deleted and an indication of a snapshot (a MF root vertex representing a snapshot) to be deleted (block 810).

In some cases, system 10 (e.g. utilizing MF deletion module 150) can be further configured to perform the vertex private sub-graph deletion process 600 for the indicated snapshot (MF) within the indicated graph (block 820).

It is to be noted that, with reference to FIG. 18, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 19, a flowchart illustrating one example of a sequence of operations carried out for creating a child snapshot, in accordance with the presently disclosed subject matter.

According to some examples of the presently disclosed subject matter, system 10 (e.g. utilizing MF creation module 120) can be configured to receive an indication of a graph into which the snapshot is to be inserted and an indication of a snapshot (contained in the graph) to be cloned (block 910).

In some cases, system 10 (e.g. utilizing MF creation module 120) can be further configured to perform the root cloning process 300 for cloning the indicated snapshot (MF) within the indicated graph in order to create a new snapshot (MF) (block 920). The new MF created as a result of performing the root cloning process 300 is the new snapshot. It can be appreciated that, at this stage (following the root cloning process and prior to modification thereof), the new snapshot shares its child vertices with at least one other snapshot (at least one other MF root vertex representing a snapshot) from which it was cloned.

It is to be noted that, with reference to FIG. 19, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 20 is a flowchart illustrating one example of a sequence of operations carried out for reading from a snapshot, in accordance with the presently disclosed subject matter.

According to some examples of the presently disclosed subject matter, system 10 (e.g. utilizing MF read module 160) can be configured to receive an indication of a graph, an indication of a snapshot (an MF root vertex) contained in the graph from which data is to be read and the key value of the data to be read (block 1010).

In some cases, system 10 (e.g. utilizing MF read module 160) can be further configured to perform a search in the snapshot (in the MF) in order to find the address of the data according to the key value (block 1020). It is to be noted that the search can be performed according to the semantics of the relevant tree data structure representing the snapshot (the MF).

It is to be noted that, with reference to FIG. 20, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 21 is a flowchart illustrating one example of a sequence of operations carried out for modifying a snapshot, in accordance with the presently disclosed subject matter.

According to some examples of the presently disclosed subject matter, system 10 (e.g. utilizing MF modification module 130) can be configured to receive an indication of a graph, an indication of a snapshot (an MF root vertex) contained in the graph to be modified and an indication of a vertex to be modified (block 1110). It is to be noted that a vertex modification can be, in some cases, any update of any data related to the vertex (including any addition and/or deletion of data related to the vertex), whereas in some cases, only an update of certain vertex data (e.g. edges, keys, etc.) can be considered a modification. It is to be further noted that a vertex modification can be triggered for example by an insertion of a new vertex to the snapshot (thereby, in some cases, causing a modification of the keys and/or edges and/or indexes and/or other vertex data of other existing vertices) or by a deletion of a vertex from the snapshot (thereby, in some cases, causing a modification of the keys and/or edges and/or indexes of other existing vertices), or for any other reason.

In some cases, system 10 (e.g. utilizing MF modification module 130) can be further configured to modify the snapshot (the MF) accordingly, while prior to the modification, MF modification module 130 can be configured to perform the prepare for vertex content modification process 500 (block 1120). It is to be noted that the modification can be performed according to the semantics of the relevant tree data structure representing the snapshot (the MF).

It is to be noted that, with reference to FIG. 21, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is drawn to FIG. 22, showing a flowchart illustrating one example of a sequence of operations carried out for releasing counter nodes, in accordance with the presently disclosed subject matter.

In some cases, system 10 (e.g. utilizing MF deletion module 150) can be configured to perform a reference counters handover process 1200.

System 10 can be configured to check, for a given counter manager vertex, if the number of reference counters greater than 1 contained within the given counter manager vertex is below a reference counters transfer threshold (i.e. a threshold below which the reference counters should be handed over to one or more other counter manager vertices) (block 1210). If the number of reference counters greater than 1 is not below such a threshold, the process ends.

If the number of reference counters greater than 1 is indeed below the reference counters transfer threshold, system 10 can be configured to handover the reference counters of the given counter manager vertex to one or more other counter manager vertices. For this purpose, system 10 can be configured to group the descendant-MFs of the MF containing the reference counter to handover into sub-groups so that each sub-group is not joined to the others (i.e. no two groups have any shared MFs) and each sub-group is headed by a leader-MF that is the first MF (the top-most descendant of the MF containing the given counter manager vertex) in such a group that has a reference to the reference counter that is to be handed over (block 1215).

In some cases, system 10 can be configured to check, for each reference counter, if its respective vertex is pointed at by vertices of more than one leader—MF (block 1220). If not, system 10 can be configured to handover such reference counter to another vertex that points, for the respective reference counter, at the given counter manager vertex within the MF containing the given counter manager vertex (e.g. to the first vertex that is found pointing at the given counter manager vertex) (block 1230). System 10 can be further configured to scan the MF containing the given counter manager vertex and update any reference pointing thereto to point at the new counter manager vertex to which the reference counter has been handed over (block 1240).

If however, the reference counter's respective vertex is pointed at by vertices of more than one leader-MF, system 10 can be configured to handover the respective reference counter to a vertex within a selected leader-MF (e.g. within the first found leader-MF) which has a reference to the respective vertex (block 1250). System 10 can be further configured, for each leader-MF other than the selected leader-MF, to clone the respective vertex and replace all references to it within the leader-MF and all descendant-MFs thereof, with references to the its clone (block 1260). The vertex referencing the clone within the leader-MF becomes the counter manager vertex of the clone.

System 10 can be further configured to calculate updated reference counters of the respective vertex and its clones (block 1270), e.g. by scanning the affected MFs to check how many vertices are pointing at the respective vertex and its clones.

In some cases, system 10 can be configured to check if all of the reference counters within the given counter manager vertex have been handed over (block 1280) and if so—it can be configured to perform a private sub-graph deletion process on it (block 1290).

It is to be noted that, with reference to FIG. 22, some of the blocks can be integrated into a consolidated block or can be broken down to a few blocks and/or other blocks may be added. Furthermore, in some cases, the blocks can be performed in a different order than described herein (for example, block 1270 can be performed before block 1260, etc.). It is to be further noted that some of the blocks are optional. It should be also noted that whilst the flow diagram is described also with reference to the system elements that realizes them, this is by no means binding, and the blocks can be performed by elements other than those described herein.

Having described the MFs data structure, attention is drawn back to the CDP.

Figure 23A:
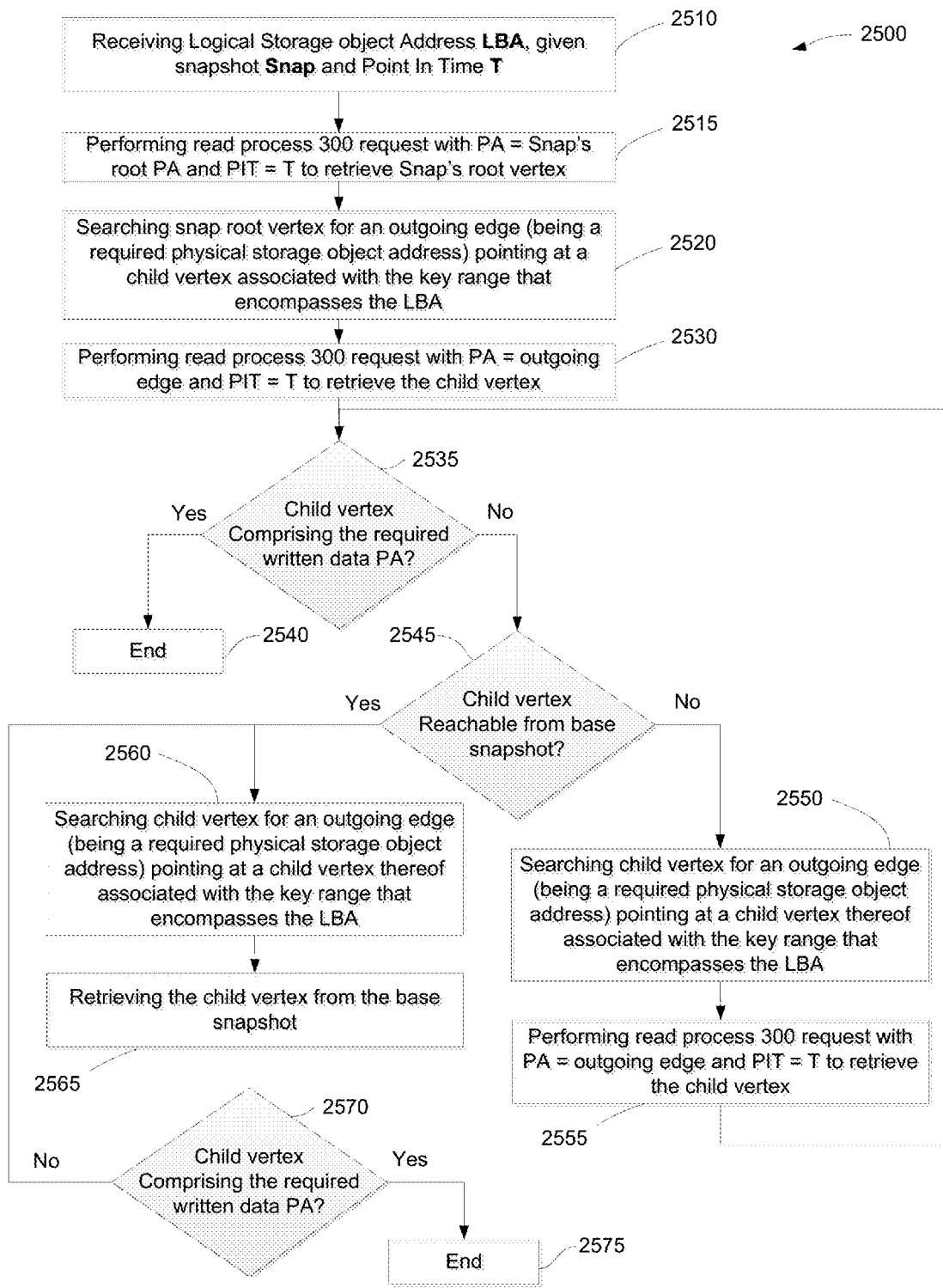
FIG. 23a is a flowchart illustrating another example of a sequence of operations carried out for reading data having a given logical storage object address, in a given point-in-time, from the CDP data structure, in accordance with the presently disclosed subject matter.

FIG. 23a is a flowchart illustrating another example of a sequence of operations carried out for reading routing data having a given logical storage object address, in a given point-in-time, from the CDP data structure, in accordance with the presently disclosed subject matter.

Before turning to the MF routing data read process 2500, and as indicated herein, the snapshots can be represented by various data structures. One example of snapshot implementation is the array data structure disclosed herein, inter alia with respect to FIGS. 6a and 6b. In the example illustrated in FIG. 23a, the snapshots are represented by another data structure—a Mapping Function (also referred to herein as a "snapshot MF"). As indicated herein (inter alia with respect to FIG. 3), multiple MFs can form a graph data structure, where each snapshot MF is represented by a tree data structure. In such implementations, the logical storage object address is used for identifying a certain vertex within a given snapshot MF that contains the physical storage object addresses pointing at the physical location of the data written to the corresponding logical storage object address. As an example, when a write operation to a given logical block address of a given (active) snapshot MF is performed, the vertex that is associated with the given logical block address is updated to indicate the physical storage object address in which the written data, written to the given logical block address of the given snapshot MF, is stored (e.g. on the third memory).

It is to be noted that in some cases, multiple writes to a given logical storage object address can be performed over a certain time window, and information of such write operations can also be logged in the log (including information of changes made to the snapshot MF as part of these write operations). The write operations to a certain logical storage object address made on different points in time can each be mapped to different physical storage object addresses (stored on the corresponding vertex of the snapshot MF at the respective point in time).

As indicated herein, multiple snapshots can be acquired after the first point in time. When a snapshot is acquired, the active writeable snapshot MF becomes a read only snapshot MF and a new active writeable snapshot MF is created, as a child snapshot thereof (in accordance with the process described with respect to FIG. 19). The snapshot that became read only is also referred to as a parent snapshot of the new active writeable snapshot. Each snapshot MF can include information of write operations that have been performed while it was the active writeable snapshot and information about write operations that took place beforehand (as it is a child snapshot MF of the snapshot MF from which it was cloned).

Turning to the MF routing data read process 2500, according to some examples of the presently disclosed subject matter, system 10 can be configured to perform an MF routing data read process 2500 of reading data that is associated with a given logical storage object address at a certain point in time (e.g. utilizing read module 135).

In some cases, the system 10 can be configured to receive the given logical storage object address (which, in the snapshot MF exemplary implementation, can be used as a key in order to navigate in the MF to the vertex that is associated with the given logical block address), an indication of a given snapshot (e.g. a snapshot identifier that enables determination of the relevant snapshot MF which maps the given logical storage object address to its corresponding physical storage object addresses) and a required point in time (block 2510). It is to be noted that in some cases, when multiple graph data structures exist, the system 10 can also receive an indication of a given graph, however in this example we will assume (without loss of generality) that a single graph data structure exists.

In some cases, the system 10 can be configured to perform the CDP read process 2300 utilizing the physical storage object address of the given snapshot's root vertex (that can be obtained, for example, from a mapping table that stores the physical storage object address of each snapshot MF's root vertex), and the required point in time, in order to retrieve the given snapshot MF's root vertex as it was at the required point in time (block 2515). It is to be noted that the given snapshot MF's root vertex, and any descendent thereof (a descendent vertex is a child vertex, a child vertex of the child vertex, and any lower level vertex until the leaf vertex, that directly points at, or that is, the actual written data), is not necessarily static, as, for example, its navigation keys and its edges can change over time following various write operations, and in case such changes occur, they are logged in the log. It is to be noted that in the example provided herein, upon a change to a vertex (including a root vertex), the entire vertex is logged in the log. It can be appreciated that in some cases only part of the vertex can be logged (e.g. only the part that is changed, along with an identifier of the vertex that contains the changed part). Although the example does not refer to such alternative implementations, the specific implementation disclosed herein is by no means limiting, and other implementations can be used, as any person of ordinary skill in the art can appreciate.

System 10 can be further configured to search the retrieved snapshot root vertex for an outgoing edge (that is a physical storage object address) that points at a child vertex thereof that is associated with the key range that encompasses the given logical storage object address (that, as indicated above, can be used as a key for navigating in the snapshot MF) (block 2520). After locating the required outgoing edge (which is a physical storage object address of the child vertex associated with the key range that encompasses the given logical storage object address), the corresponding child vertex (being routing data), as it was at the required point in time, can be retrieved from the CDP data structure by performing the CDP read process 2300 utilizing the outgoing edge (being the required physical storage object address) and the given point in time (block 2530). It is to be noted that the outgoing edge of the snapshot root vertex is an incoming edge of the corresponding child vertex.

System 10 can be further configured to check if the retrieved child vertex (being the routing data) comprises the physical storage object address pointing at the required written data (block 2535). If so—the process ends (block 2540). However, if it does not, system 10 can be configured to check if the child vertex is reachable from the base snapshot (e.g. as the result of the CDP read process 2300 is matching third routing data or matching fourth routing data) (block 2545). If the child vertex is not reachable from the base snapshot, it means that it, or a descendent vertex thereof, has changed after the given snapshot MF was created. In such case, system 10 can be further configured to search the retrieved child vertex for an outgoing edge (that is a physical storage object address) that points at a child vertex thereof that is associated with the key range that encompasses the given logical storage object address (that, as indicated above, can be used as a key for navigating in the snapshot MF) (block 2550). After locating the required outgoing edge (which is a physical storage object address of the child vertex associated with the key range that encompasses the given logical storage object address), the corresponding child vertex (being routing data), as it was at the required point in time, can be retrieved from the CDP data structure by performing the CDP read process 2300 utilizing the outgoing edge (being the required physical storage object address) and the given point in time, in order to retrieve the corresponding child vertex pointed at by the outgoing edge (block 2555), and the process repeats to block 2535 with the newly retrieved child vertex.

Returning to block 2545, if the check indicates that the child vertex is reachable from the base snapshot, it means that neither the child vertex, nor any descendent vertex thereof, have been changed since the base snapshot has been acquired, and therefore, the traversal of the snapshot MF can be performed without accessing the log, as the log will not contain any descendent vertex of the child vertex (since the log contains only vertices that have changed since the base snapshot was acquired). In such case, system 10 can be further configured to search the retrieved child vertex for an outgoing edge (that is a physical storage object address) that points at a child vertex thereof that is associated with the key range that encompasses the given logical storage object address (that, as indicated above, can be used as a key for navigating in the snapshot MF) (block 2560). After locating the required outgoing edge (which is a physical storage object address of the child vertex associated with the key range that encompasses the given logical storage object address), the corresponding vertex, as it was at the required point in time, can be retrieved from the base snapshot 9110 (by reading the vertex from the physical storage object address defined by the located required outgoing edge) (block 2565.

After retrieval of the child vertex from the base snapshot 9110, system 10 can be configured to check if the retrieved child vertex comprises the physical storage object address pointing at the required written data (block 2570). If so—the process ends (block 2575). However, if it does not, system 10 can be configured to return to block 2560, with the newly retrieved child vertex (retrieved from the base snapshot 9110).

It is to be noted that, with reference to FIG. 23*a*, some of the blocks can be integrated into a consolidated block or can be broken down to a few blocks and/or other blocks may be added. Furthermore, in some cases, the blocks can be performed in a different order than described herein (for example, blocks 2550 and 2560 can be performed before block 2545, etc.). It is to be further noted that some of the blocks are optional. It should be also noted that whilst the flow diagram is described also with reference to the system elements that realizes them, this is by no means binding, and the blocks can be performed by elements other than those described herein.

Figure 23B:
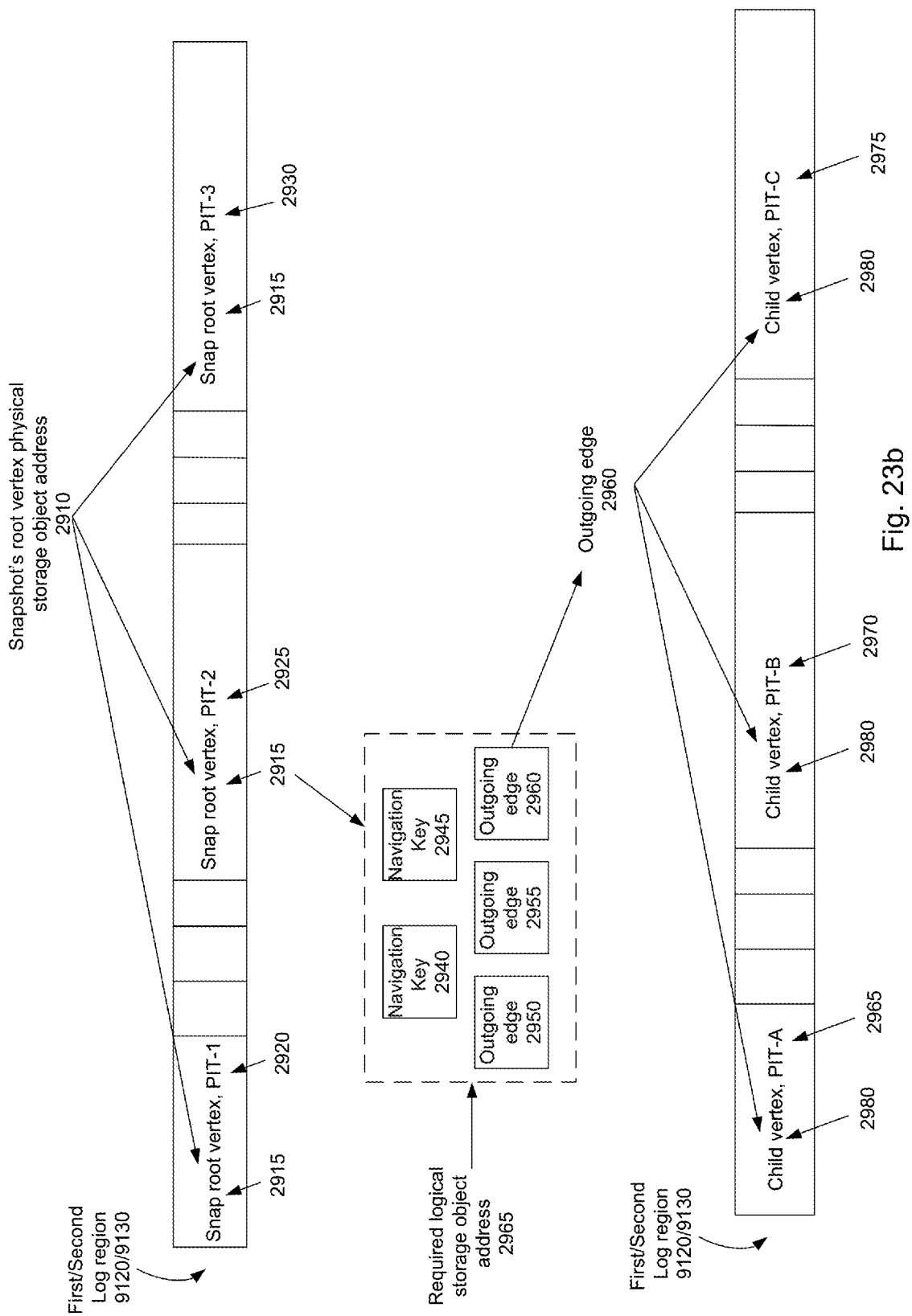
FIG. 23b is another exemplary schematic illustration of a sequence of operations carried out for reading data having a given logical storage object address, in a given point-in-time, from the CDP data structure, in accordance with the presently disclosed subject matter.

In order to have a visual illustration of the MF routing data read process 2400, attention is drawn to FIG. 23*b* showing another exemplary schematic illustration of a sequence of operations carried out for reading data having a given logical storage object address, in a given point-in-time, from the CDP data structure, in accordance with the presently disclosed subject matter.

As indicated with respect to FIG. 23*a*, the system 10 receives an indication of a given snapshot, a given logical storage object address shown as Logical Address (LA) 2810, and a required point in time (not shown). The given snapshot has a snapshot root vertex physical storage object address 2910.

The system 10 can utilize the given snapshot's root vertex physical storage object address and the required point in time in order to retrieve the given snapshot's root vertex, as it was at the required point in time, from the log (either the first log region 9120 or the second log region 9130). In the illustrated example, the given snapshot's root vertex was updated on three different times: PIT-1 2920, PIT-2 2925 and PIT-3 2930. For the purpose of the illustrated example it is assumed that all of the write operations occurred either before the checkpoint 9140 or after the checkpoint 9140, so that they are all logged either in the first log region 9120 or in the second log region 9130. For the purpose of the illustration we will assume that the required point in time is later than PIT-2 2925 and earlier than PIT-3 2930, and therefore the system 10 will retrieve the given snapshot's root vertex 2915 as it was in PIT-2.

Following retrieval of the given snapshot's root vertex 2915, the system 10 can utilize the given logical storage object address 2965 in order to find the outgoing edge that points at a child vertex thereof that is associated with the key range that encompasses the given logical storage object address 2965.

It is to be noted that each vertex has navigation keys (in the illustrated example—navigation key 2940, navigation key 2945) that define key ranges, where each key range is associated with an outgoing edge (in the illustrated example—outgoing edge 2950, outgoing edge 2955, outgoing edge 2960). For the purpose of the illustration we will assume that the given logical storage object address 2965 is greater than navigation key 2945, and therefore, the sub-tree spanned by the child vertex pointed at by the outgoing edge 2960 encompasses the given logical storage object address 2965.

Having the outgoing edge 2960, system 10 can be configured to retrieve the child vertex pointed by the outgoing edge 2960.

In the illustrated example, the child vertex 2980 pointed at by the outgoing edge 2960 was updated on three different times: PIT-A 2965, PIT-B 2970 and PIT-C 2975. For the purpose of the illustrated example it is assumed that all of the write operations occurred either before the checkpoint 9140 or after the checkpoint 9140, so that they are all logged either in the first log region 9120 or in the second log region 9130. For the purpose of the illustration we will assume that the required point in time is later than PIT-A 2965 and earlier than PIT-B 2970, and therefore the system 10 will retrieve the child vertex 2980 as it was in PIT-A.

After retrieval of the child vertex 2980, the system 10 will repeat the process of identifying the outgoing edge of its outgoing edges that points at the sub-tree that encompasses the given logical storage object address 2965, until the retrieved descendant vertex will be the vertex that comprises the physical storage object address of the required written data (not shown).

Attention is now drawn to FIG. 24, showing a flowchart illustrating one example of a sequence of operations carried out for reading the written data in a scenario where the written data is not logged in the log, in accordance with the presently disclosed subject matter.

According to some examples of the presently disclosed subject matter, in scenarios where the written data is not logged in the log, system 10 (e.g. utilizing read module 135) can be configured to receive the physical storage object address of the required written data (retrieved for example utilizing the array routing data read process 2400 or by the MF routing data read process 2500) (block 2610) and to read the written data from the physical storage object address of the third memory 117 (block 2620). The data that is stored on the physical storage object address is guaranteed to be the required written data (as detailed herein).

It is to be noted that, with reference to FIG. 24, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 25:
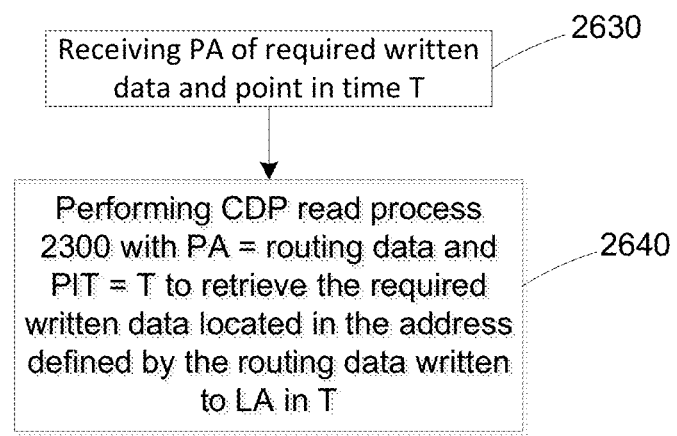
FIG. 25 is a flowchart illustrating one example of a sequence of operations carried out for reading the written data in a scenario where the written data is logged in the log, in accordance with the presently disclosed subject matter.

Attention is now drawn to FIG. 25, showing a flowchart illustrating one example of a sequence of operations carried out for reading the written data in a scenario where the written data is logged in the log, in accordance with the presently disclosed subject matter.

According to some examples of the presently disclosed subject matter, in scenarios where the written data is logged in the log, system 10 (e.g. utilizing read module 135) can be configured to receive the physical storage object address of the required written data (retrieved for example utilizing the array routing data read process 2400 or by the MF routing data read process 2500) and a given point in time (block 2630) and to perform the CDP read process 2300 utilizing the received physical storage object address and the given point in time, in order to retrieve the corresponding written data that was stored on the received physical storage object address at the given point in time (block 2640).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It is to be noted that, with reference to FIG. 25, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It will also be understood that the system according to the presently disclosed subject matter can be implemented, at least partly, as a suitably programmed computer. Likewise, the presently disclosed subject matter contemplates a non-transitory computer program being readable by a computer for executing the disclosed method. The presently disclosed subject matter further contemplates a machine-readable memory tangibly embodying a program of instructions executable by the machine for executing the disclosed method.

The invention claimed is:

1. A computerized system comprising:
a processor; and
a computer-readable non-transient memory in communication with the processor, the memory storing instructions that, when executed by the processor, manage a Continuous Data Protection (CDP) data structure that includes:
a base snapshot acquired at a first point-in-time and configured to provide mapping between corresponding addresses of logical storage objects and physical storage objects that become read-only after the base snapshot has been acquired; and
a log including a first log region and a second log region, the log being associated with an index including a first index region associated with the first log region and a second index region associated with the second log region, wherein:
a boundary point-in-time between the first log region and the second log region is defined by a dynamic checkpoint updatable in accordance with a checkpoint update criterion;
the first log region includes first routing data informative of first written data corresponding to a first sequence of all write operations performed after the first point-in-time and before the boundary point-in-time defined by the dynamic checkpoint;
the first index region is stored on a secondary memory and facilitates access to the first routing data;
the second log region includes second routing data informative of second written data corresponding to a second sequence of write operations performed after the boundary point-in-time defined by the dynamic checkpoint;
the second index region is stored on a primary memory and facilitates access to the second routing data; and
upon receiving a read request including a required physical storage object address and a required point-in-time, the processor compares the required point-in-time to the boundary point-in-time,
in response to the required point-in-time being at the same time or later than the boundary point-in-time, the processor searches the second log region for (i) a physical storage object address that matches the required physical storage object address and (ii) a corresponding write time data that is at the same time or earlier than the required point-in-time; and
in response to the required point-in-time being less than the boundary point-in-time, the processor searches the first log region for (i) the physical storage object address that matches the required physical storage object address and (ii) the corresponding write time data that is at the same time or earlier than the required point-in-time.

2. The system of claim 1, wherein the checkpoint update criterion is indicative of a pre-defined threshold for a size of the second index region, and the checkpoint update criterion is met when a size of the second index region exceeds the pre-defined size threshold.

3. The system of claim 1, wherein the checkpoint update criterion is indicative of a threshold for a size of the second index region, the threshold being dynamically calculated in accordance with available space of the primary memory.

4. The system of claim 1, further configured to update the first log region and the second log region responsive to updating the dynamic checkpoint when the checkpoint update criterion is met.

5. The system of claim 4, wherein the update of the first log region and the second log region includes writing to the secondary memory a portion of second routing data informative of second written data corresponding to write operations before the boundary point-in-time, thereby moving the portion to the first log region.

6. The system of claim 4, further configured to update the first index region responsive to update the first log region and the second log region, and to update the second index region upon update of the first index region.

7. The method of operating a computerized system comprising a processor and a computer-readable non-transient memory in communication with the processor, the method comprising:
storing, in the memory, a Continuous Data Protection (CDP) data structure that includes:
a base snapshot acquired at a first point-in-time and configured to provide mapping between corresponding addresses of logical storage objects and physical storage objects that become read-only after the base snapshot has been acquired; and a log including a first log region and a second log region, the log being associated with an index including a first index region associated with the first log region and a second index region associated with the second log region, wherein a boundary point-in-time between the first log region and the second log region is defined by a dynamic checkpoint updatable in accordance with a checkpoint update criterion;

storing, in the first log region, first routing data informative of first written data corresponding to a first sequence of all write operations performed after the first point-in-time and before the boundary point-in-time defined by the dynamic checkpoint, wherein the first index region is stored on a secondary memory and facilitates access to the first routing data;

storing, in the second log region, second routing data informative of second written data corresponding to a second sequence of write operations performed after the boundary point-in-time defined by the dynamic checkpoint, wherein the second index region is stored on a primary memory and facilitates access to the second routing data; and updating the first log region and the second log region responsive to updating the dynamic checkpoint when the checkpoint update criterion is met, including:

upon receiving a read request including a required physical storage object address and a required point-in-time, comparing the required point-in-time to the boundary point-in-time, in response to the required point-in-time being at the same time or later than the boundary point-in-time, the searching the second log region for (i) a physical storage object address that matches the required physical storage object address and (ii) a corresponding write time data that is at the same time or earlier than the required point-in-time; and in response to the required point-in-time being less than the boundary point-in-time, searching the first log region for (i) the physical storage object address that matches the required physical storage object address and (ii) the corresponding write time data that is at the same time or earlier than the required point-in-time.

8. The method of claim 7, wherein the checkpoint update criterion is indicative of a pre-defined threshold for a size of the second index region, and the checkpoint update criterion is met when a size of the second index region exceeds the pre-defined size threshold.

9. The method of claim 7, wherein the checkpoint update criterion is indicative of a threshold for a size of the second index region, the threshold being dynamically calculated in accordance with available space of the primary memory.

10. The method of claim 7, wherein updating the first log region and the second log region includes writing to the secondary memory a portion of second routing data informative of second written data corresponding to write operations before the boundary point-in-time, thereby moving the portion to the first log region.

11. The method of claim 10, further comprising updating the first index region responsive to update the first log region and the second log region, and updating the second index region upon updating the first index region.

* * * * *